US012809045B2

(12) United States Patent
Caravaca Rodriguez et al.

(10) Patent No.: US 12,809,045 B2
(45) Date of Patent: Nov. 24, 2026

(54) COLLIMATORLESS COMBINED COMPTON AND PROXIMITY IMAGING TECHNOLOGY

(71) Applicant: The Regents of the University of California, Oakland, CA (US)

(72) Inventors: Javier Caravaca Rodriguez, San Francisco, CA (US); Youngho Seo, San Francisco, CA (US)

(73) Assignee: The Regents of the University of California, Oakland, CA (US)

(*) Notice: Subject to any disclaimer, the term of this patent is extended or adjusted under 35 U.S.C. 154(b) by 202 days.

(21) Appl. No.: 18/702,725

(22) PCT Filed: Oct. 19, 2022

(86) PCT No.: PCT/US2022/047128
§ 371 (c)(1),
(2) Date: Apr. 18, 2024

(87) PCT Pub. No.: WO2023/069513
PCT Pub. Date: Apr. 27, 2023

(65) Prior Publication Data

US 2024/0418878 A1 Dec. 19, 2024

Related U.S. Application Data

(60) Provisional application No. 63/257,428, filed on Oct. 19, 2021.

(51) Int. Cl.
*G01T 1/29* (2006.01)
*G01T 1/24* (2006.01)

(52) U.S. Cl.
CPC ............ *G01T 1/2971* (2013.01); *G01T 1/249* (2013.01)

(58) Field of Classification Search
CPC ......... G01T 1/29; G01T 1/2971; G01T 1/249; G01T 1/1642; G01T 1/2907; G01T 1/242;
(Continued)

(56) References Cited

U.S. PATENT DOCUMENTS 3,919,556 A 11/1975 Berninger
5,841,140 A 11/1998 McCroskey et al.
(Continued)

FOREIGN PATENT DOCUMENTS

CN 108523916 9/2018
WO WO 2001001167 A2 1/2001
WO WO 2002025310 A2 3/2002

OTHER PUBLICATIONS

Gosewisch et al., (2021) "Image-based dosimetry for 225Ac-PSMA-I&T therapy using quantitative SPECT". In: *European Journal of Nuclear Medicine and Molecular Imaging* 48 (2021), pp. 1260-1261.

(Continued)

*Primary Examiner* — Irakli Kiknadze
(74) *Attorney, Agent, or Firm* — Edward J. Baba; Christian S. Hans; Bozicevic, Field & Francis LLP

(57) ABSTRACT

Gamma cameras are provided. The subject gamma cameras include an analysis region comprising a spatial area configured to receive a sample, a first detector head positioned to receive gamma radiation from the analysis region, the first detector head including a first scatterer and a first absorber parallel to the first scatterer, and a second detector head positioned on the opposite side of the analysis region relative to the first detector head, the second detector head including a second scatterer and a second absorber parallel to the second scatterer. Systems and methods for practicing the invention are also provided.

21 Claims, 23 Drawing Sheets

(58) Field of Classification Search

CPC ... G01T 1/20181; G01T 1/2985; G01T 1/243; G01T 1/2914; G01T 1/2964; G01T 1/2928; G01T 1/1606; G01T 1/24; G01T 1/2935; G01T 1/2921; G01T 1/16; G01T 1/1603; G01T 1/2018; G01T 1/202; G01T 1/167; G01T 1/1644; G01T 7/00; G01T 1/2006; G01T 1/2023; G01T 1/166; G01T 1/164; G01T 1/1663; A61B 6/06; A61B 6/4225; A61B 6/037; A61B 6/4266; A61B 6/44; A61B 6/4275; A61B 6/4258; A61B 6/4417; A61B 6/0407; A61B 6/5282; A61B 6/4411; A61B 6/4429; A61B 6/4233; A61B 6/4208; A61B 6/5205; A61B 6/4291; A61B 6/12; A61B 6/502; A61B 6/501; A61B 6/0414; A61B 6/4458; A61B 6/503; A61B 6/483; G21K 1/02; G06T 11/006; G06T 2211/421; G06T 12/20

USPC ...................................................... 378/98, 62

See application file for complete search history.

(56) References Cited

U.S. PATENT DOCUMENTS

| | | | |
|---|---|---|---|
| 7,087,903 B2 | 8/2006 | Balan et al. | |
| 7,102,138 B2 | 9/2006 | Belvis et al. | |
| 7,394,072 B2 | 7/2008 | Macciocchi | |
| 8,119,980 B2 | 2/2012 | Malmin et al. | |
| 8,822,910 B2 | 9/2014 | Wang et al. | |
| 8,968,469 B2 | 3/2015 | Basu et al. | |
| 9,000,385 B2 | 4/2015 | Dror et al. | |
| 9,638,811 B2 | 5/2017 | Iltis | |
| 10,502,844 B2 | 12/2019 | Hugg et al. | |
| 2016/0291174 A1* | 10/2016 | Ishii | G01T 1/38 |
| 2017/0212254 A1 | 7/2017 | Gemba | |
| 2019/0353807 A1* | 11/2019 | Furenlid | G01T 1/20181 |
| 2020/0319123 A1* | 10/2020 | Tanimori | G01N 23/20066 |
| 2021/0173096 A1* | 6/2021 | Petrak | G01T 1/1644 |
| 2021/0290196 A1* | 9/2021 | Rodrigues | A61B 6/44 |
| 2022/0104781 A1* | 4/2022 | Teshigawara | A61B 6/4208 |

OTHER PUBLICATIONS

Kadrmas,(2004), “LOR-OSEM: Statistical PET reconstruction from raw line-of-response histograms”, *Physics in Medicine & Biology*, 49(20), 4731-4744.

Kamaleshwaran et al., (2020) “Whole-body and Single-Photon Emission Computed Tomography/Computed Tomography Postpeptide Receptor Alpha Radionuclide Therapy Images of Actinium 225-Tetraazacyclododecanetetraacetic Acid-Octreotide as a Primary Modality of Treatment in a Patient with Advanced Rectal Neuroendocrine Tumor with Metastases”. In: *Indian J Nucl Med*. 35.Issue 3 pp. 226-228.

Ocak et al., (2020) “Post-therapy imaging of 225Ac-DOTATATE treatment in a patient with recurrent neuroendocrine tumor”. In: *European Journal of Nuclear Medicine and Molecular Imaging* 47 (2020), pp. 2711-2712.

Reilhac et al. (2007), “Simulation-based evaluation of OSEM iterative reconstruction methods in dynamic brain PET studies”, *Neuroimage*, 39(1), 359-368.

Shimazoe et al (2018) “Development of simultaneous PET and Compton imaging using GAGG-SiPM based pixel detectors”, Nuclear Instruments & Methods in Physics Research. vol. 954.

Usmani et al., (2019) “225Ac Prostate-Specific Membrane Antigen Posttherapy alpha Imaging”. In: *Clinical Nuclear Medicine* 44. Issue 5 (2019), pp. 401-403.

Wilderman et al., (2001) “Improved Modeling of System Response in List Mode EM Reconstruction of Compton Scatter Camera Images” *IEEE Transactions on Nuclear Science*, 48(1), pp. 111-116.

* cited by examiner

COLLIMATORLESS COMBINED COMPTON AND PROXIMITY IMAGING TECHNOLOGY

CROSS-REFERENCE TO RELATED APPLICATIONS

This application claims the benefit of U.S. Provisional Patent Application No. 63/257,428, filed Oct. 19, 2021, which application is incorporated herein by reference in its entirety.

STATEMENT OF GOVERNMENT SUPPORT

This invention was made with Government support under Grant No. R01EB026331 awarded by The National Institutes of Health. The Government has certain rights in the invention.

INTRODUCTION

Targeted alpha therapy (TAT) has shown excellent results in the treatment of different types of solid and liquid cancers, with superior performance than the standard beta radiotherapy with $^{177}$Lu in certain scenarios. The higher linear energy transfer of alpha particles over beta particles offer a much more targeted modality. Alpha particles deposit all their energy in a range of the order of microns, as opposed to beta particles, whose millimeters range leads to a higher healthy tissue damage.

$^{225}$Ac is a very promising alpha emitter for TAT due to its high delivered dose (four alpha particles emitted in its decay chain) and its long half-life of 10.4 days, which makes radiopharmaceutical handling and patient delivery easier. A crucial step in the development of novel $^{225}$Ac TAT radiopharmaceuticals is the characterization of their pharmacokinetics (PK), typically done determining its efficacy and toxicity over time in small animals (e.g., mice). This is particularly important in $^{225}$Ac since it decays to four other alpha emitters ($^{221}$Fr, $^{217}$At, $^{213}$Bi and $^{213}$Po) and the recoil and different chemical affinity can detach them from the radiopharmaceuticals, releasing a toxic dose in healthy tissue. PK studies are typically done ex vivo by sacrificing a large number of mice at different time points, dissecting their organs, and deploying them in a gamma or alpha counter to obtain the per-organ dose as a function of time. In vivo methods are preferred since they are easier to execute compared to the ex vivo approach, they provide a 3D dose maps, and they would enable the study of PK in the same mouse over the treatment and evolution of the malignancy.

Since alpha particles are absorbed in the tissue, the only externally detectable signals from $^{225}$Ac are gamma-rays and beta particles. Beta particles rarely exit the body, but they can produce Cherenkov light in tissue. Such has been demonstrated using imaging tools (e.g., Cherenkov Lumiscense Imaging). However, such tools present some limitations, namely, the inability to provide specific information of the location of each alpha emitter in the $^{225}$Ac decay chain. In addition, dosimetry studies using these tools are subject to important uncertainties, and are unable to identify the type of radionuclide.

The gamma ray emissions of $^{221}$Fr (218 keV) and $^{213}$Bi (440 keV) with branching ratios 11.4% and 25.9%, respectively, can be used to obtain quantitative dose maps using single photon emission computed tomography (SPECT). This has been demonstrated with a commercial system (Vector) with phantoms that required doses two orders of magnitude higher than the toxicity limit in mice and with 24-hours exposures. These features prohibit in vivo imaging. In clinical trials, commercial SPECT/CT systems have shown promise detecting $^{225}$Ac [1-5], but the images are far from the quality required for precise dosimetry due to the limitations of current systems.

Gamma ray imaging of Ac daughters is extremely challenging due to, first, the extremely low injected dose (1 MBq/kg). compared to those for beta therapy or Tc imaging; and second, the energy of the gamma rays being relatively high (>200 keV), which current SPECT systems are unable to detect with a good efficiency, given that they are typically optimized for the 140 keV gamma emission of Tc. A novel multi-pinhole detector is proposed in [6] that yields a high sensitivity and good energy resolution for a broad range of energies 100 keV-500 keV. Despite the progress, in vivo imaging of $^{225}$Ac radiopharmaceuticals has yet to be demonstrated.

SUMMARY

The present inventors have found that one of the main drivers of low sensitivity is the collimator present in standard imaging (e.g., SPECT) systems. Embodiments of the collimator-less approach of the present invention that combines Compton imaging with proximity imaging satisfy this desire. Compton imaging is a modality that has successfully demonstrated imaging of radionuclides in vivo in different scenarios: single isotopes within a broad range of energies, multi-isotope imaging, pre-clinical imaging and clinical imaging. The inventors have found that Compton imaging provides a higher gamma ray detection efficiency and performs better than standard SPECT systems with collimators at energies over 300 keV, since, at higher energies, Compton scattering dominates over photoelectric absorption (PA) and its angular resolution improves. Proximity imaging provides an extremely high sensitivity that can be used to image extremely low dose activities with exposures of a few minutes. This modality performs better at lower energies and it provides a complementary technique to Compton imaging.

A high sensitivity gamma camera that combines Compton and proximity imaging in a single device is provided. Gamma cameras of interest include an analysis region configured to receive a sample, a first detector head positioned to receive gamma radiation from the analysis region, the first detector head comprising a first scatterer and a first absorber parallel to the first scatterer, and a second detector head positioned on the opposite side of the analysis region relative to the first detector head, the second detector head comprising a second absorber and a second scatterer parallel to the second absorber. In some cases, each of the first and second detector heads comprises two detector planes in a parallel configuration made of cadmium zinc telluride (CZT) in order to provide: 1) Compton imaging through a scatterer-absorber configuration, 2) proximity imaging enabled by a high-Z detector (e.g., the scatterer) in direct contact with the subject. CZT provides a high stopping power, pixelated, and compact material, ideal for proximity reconstruction, and, additionally, it provides an excellent energy resolution for Compton imaging. Typical Compton cameras do not use a scatterer suitable for proximity imaging since it is not made of high-Z material (e.g., Silicon), or it is not compact and cannot get close enough to the subject (e.g., Germanium detectors with a cryostat). In some embodiments, the gamma cameras of the invention do not include a collimator.

Aspects of the invention additionally include systems. Systems of interest include a gamma camera of the invention, as well as a processor in a signal-receiving relationship with the gamma camera. The subject processor is configured to construct an image based on signals received from the gamma camera. In some cases, the processor is in a signal-receiving relationship with the first and second absorbers. In such cases, the processor is configured to construct the image based on signals received from Compton scattering (e.g., via a LM-OSEM reconstruction algorithm). In certain instances, the processor is in a signal-receiving relationship with the first and second scatterers and processor is configured to construct the image based on signals received from photoelectric absorption by the first and second scatterers (e.g., via a OSEM reconstruction algorithm). Embodiments of the subject systems also include a display configured to depict the image constructed by the processor.

Aspects of the invention also include methods. Methods of interest include introducing a radioactive sample into a system of the invention, and receiving constructed image from the processor of the system. Any convenient radioactive sample may be employed. In some cases, the radioactive sample comprises a radiopharmaceutical. In some such cases, the radioactive sample may comprise (or may have comprised at one time) $^{225}$Ac and/or $^{227}$Th.

Ultrahigh-sensitivity imaging of a broad range of high energy gamma rays (100 keV to 1000 keV) is not available in conventional systems. This is necessary to image extremely low activity radionuclides in vivo, in particular, those used for targeted alpha therapy ($^{225}$Ac and $^{227}$Th), a very promising radiotherapy modality. Compton cameras provide a relatively high sensitivity, but their performance degrades at energies below 300 keV. The camera disclosed herein is a multi-modality camera that provides high sensitivity and millimeter-precision images also below that energy. For example, the camera disclosed herein provides imaging of a broad ranges of energies ranging from 100 keV to 1000 keV, 150 keV to 1000 keV, 180 keV to 1000 keV, 300 keV to 1000 keV, 500 keV to 1000 keV, and the like. The camera disclosed herein provides tomographic images of extremely low doses (e.g., 0.5 μCi of $^{225}$Ac) of a targeting radiopharmaceutical in a subject, e.g., a mouse.

BRIEF DESCRIPTION OF THE FIGURES

The invention may be best understood from the following detailed description when read in conjunction with the accompanying drawings. Included in the drawings are the following figures:

(FIG. 11B-11E: 1 mm from top scatterer, and FIG. 11F-11H: 15.5 mm from scatterer), for 221Fr and 213Bi. The simulated exposure is 15 minutes. For these images, 0.75 mm voxels, 30 subsets and 10 iterations were used.

DETAILED DESCRIPTION OF THE INVENTION

Figure 1A:
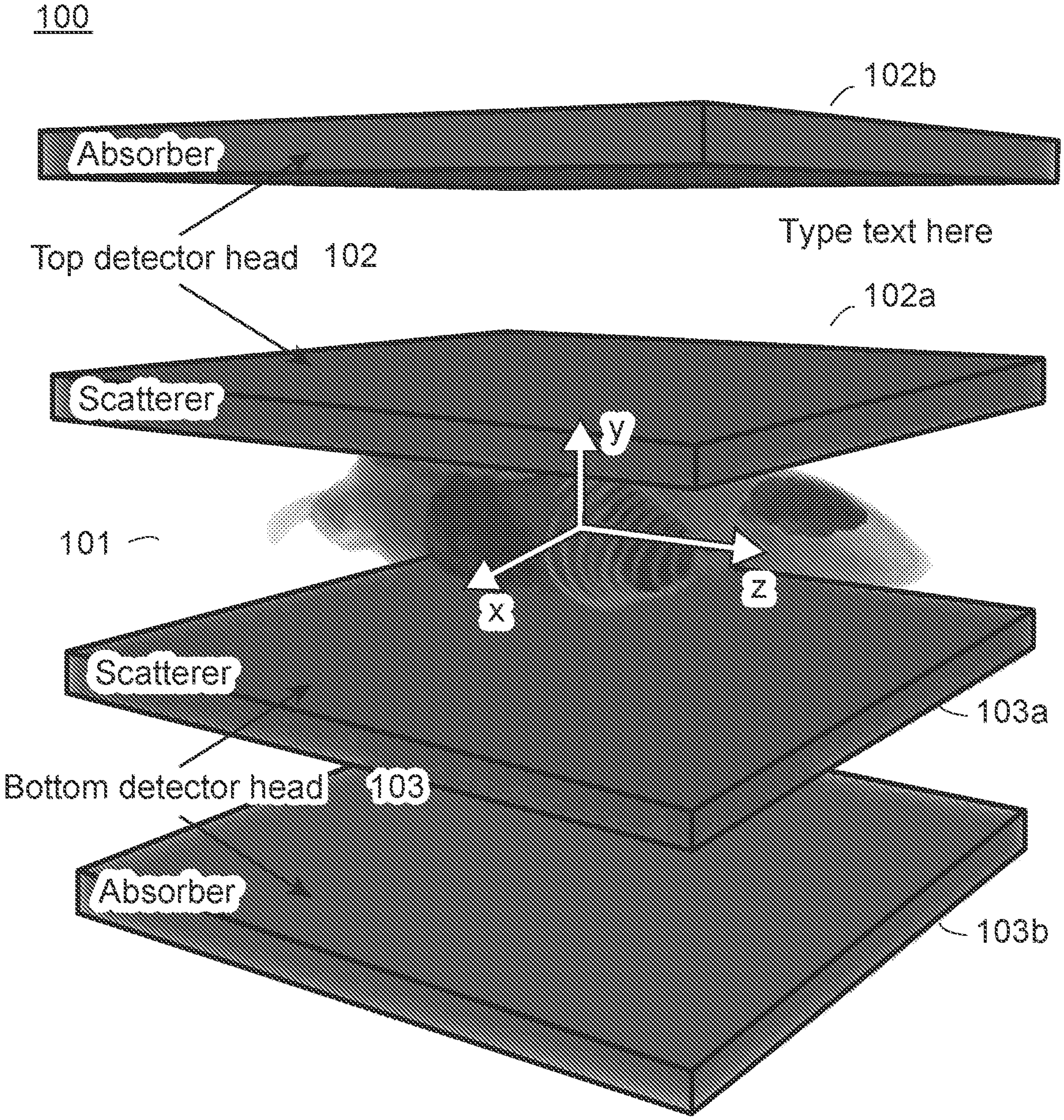
FIG. 1A-1B depict a gamma camera according to certain embodiments.

Gamma cameras are provided. The subject gamma cameras include an analysis region comprising a spatial area configured to receive a sample, a first detector head positioned to receive gamma radiation from the analysis region, the first detector head including a first scatterer and a first absorber parallel to the first scatterer, and a second detector head positioned on the opposite side of the analysis region relative to the first detector head, the second detector head including a second scatterer and a second absorber parallel to the second scatterer. Systems and methods for practicing the invention are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms “a”, “an”, and “the” include plural referents unless the context clearly dictates otherwise. It is further noted that the claims may be drafted to exclude any optional element. As such, this statement is intended to serve as antecedent basis for use of such exclusive terminology as “solely,” “only” and the like in connection with the recitation of claim elements, or use of a “negative” limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of “means” or “steps” limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Gamma Cameras

As mentioned above, aspects of the invention include gamma cameras. The gamma camera discussed herein is configured to detect gamma radiation signals, e.g., in a biological sample. In other words, the subject gamma cameras detect the presence, location, and/or abundance of one or more radionuclides (e.g., in the form of one or more radiopharmaceuticals and/or daughter nuclides resulting from radioactive decay of the same). In some embodiments, the subject devices provide for tomography (i.e., three-dimensional imaging of the interior of a solid object. In certain instances, gamma cameras of the invention are configured to detect the presence of a radiopharmaceutical composition (comprising, e.g., $^{225}$Ac) at doses that are lower than those required by conventional imaging techniques. For example, in some cases, gamma cameras as described herein enable the gamma ray imaging of radionuclides at doses of 10 MBq/kg or less, such as 9 MBq/kg or less, 8 MBq/kg or less, 7 MBq/kg or less, 6 MBq/kg or less, 5 MBq/kg or less, 4 MBq/kg or less, 3 MBq/kg or less, 2 MBq/kg or less, 1 MBq/kg or less and including 0.5 MBq/kg or less. In certain instances, the subject gamma cameras enable the detection of gamma rays having a higher energy than those detectable by conventional imaging techniques (e.g., SPECT). For example, in some cases, gamma cameras of the invention enable the detection of gamma rays having an energy of 100 keV or more, 125 keV or more, 150 keV or more, 175 keV or more, 200 keV or more, 225 keV or more, 250 keV or more, 275 keV or more, 300 keV or more, 325 keV or more, 350 keV or more, 375 keV or more, 400 keV or more, 425 keV or more 450 keV or more, 475 keV or more, and including 500 keV or more. In some cases, the camera disclosed herein provides imaging of a broad ranges of energies ranging from 100 keV to 1000 keV, 150 keV to 1000 keV, 180 keV to 1000 keV, 300 keV to 1000 keV, and 500 keV to 1000 keV.

Gamma cameras of the invention are configured to provide for high-resolution gamma ray imaging without the use of a collimator. In typical gamma cameras, collimators have been employed to absorb non-parallel rays. This allows such conventional gamma cameras to localize the origin of the gamma radiation in the sample. However, the present inventors have realized that such collimators absorb a substantial portion of gamma radiation and therefore reduce the sensitivity of the camera. As such, embodiments of the gamma cameras do not include a collimator but still permit topographic imaging of a sample.

Gamma cameras of the invention include an analysis region configured to receive a sample. In other words, the analysis region may be described as a sample reception area. The analysis region comprises a defined region in space (i.e., a spatial area) in which the sample may be placed. In certain instances, the analysis region is defined as the spatial area separating the first detector head from the second detector head. In some embodiments, the analysis region includes one or more mechanisms for receiving the sample and/or manipulating the sample once received. The analysis region may, in some embodiments, include a support structure, such as a stage. In select instances, the support structure is configured to move in an X-Y plane. Any displacement protocol may be employed to move the support structure, such as moving the support stage with a motor actuated translation stage, leadscrew translation assembly, geared translation device, such as those employing a stepper motor, servo motor, brushless electric motor, brushed DC motor, micro-step drive motor, high resolution stepper motor, among other types of motors. In some instances, the analysis region includes one or more securing mechanisms (e.g., clamps, straps, fasteners, etc.) to immobilize the sample for analysis. In some instances, the analysis region includes one or more securing mechanisms (e.g., clamps, straps, fasteners, etc.) for securing an anesthetic device (e.g., mouse anesthesia nose cone) to the analysis region. In some cases, the analysis region is enclosed and is accessible by one or more doors.

As discussed above, gamma cameras of interest include a first detector head and a second detector head. The first and second detector heads may be arranged in any convenient manner. In some cases, the detector heads are mounted in opposition (i.e., forming an angle of 180 degrees) with respect to one another. In some such cases, one detector head (e.g., the first) is positioned above the analysis region, and another detector head (e.g., the second) is positioned below the analysis region. The first and second detector heads may be set in parallel. Put another way, the second detector head may be located on the opposite side of the analysis region relative to the first detector head. In other cases, the first and second detector heads are arranged in a "side-by-side" configuration, such as where the first and second detector heads form an angle that ranges from 90 degrees to 120 degrees. In select versions, the first and second detector heads are mounted on a gantry. In some such versions, the first and second detector heads are configured to rotate around the analysis region.

The first detector head includes a scatterer (i.e., a first scatterer) and an absorber (i.e., a first absorber). By "scatterer" it is meant an entity that, when exposed to gamma radiation from the sample in the analysis region, results in Compton scattering. "Compton scattering" is referred to herein in its conventional sense to describe the scattering of a photon following interaction with a charged particle. The "Compton effect" refers to the increase in the wavelength of a photon (e.g., gamma ray photon) based on their interaction with a charged particle (e.g., electron). Any convenient scatterer may be employed. In some cases, the scatterer is comprised of a high-z material (i.e., element(s) having a high atomic number). Exemplary high-z materials include, but are not limited to, lead, copper and stainless steel. In some cases, the scatterer comprises cadmium zinc telluride (CZT). CZT is a compound comprising cadmium, zinc and tellurium (i.e., an alloy of cadmium telluride and zinc telluride), and is sufficient to provide the Compton scattering.

The first scatterer may have any convenient size. For example, the first scatterer may have a length ranging in size from 5 mm to 2000 mm, such as 10 mm to 1500 mm, such as 15 mm to 1000 mm, such as 20 mm to 500 mm, such as 25 mm to 450 mm, such as 30 mm to 400 mm, such as 35 mm to 350 mm, such as 40 mm to 300 mm, such as 45 mm to 250, such as 50 mm to 150 mm, and including 90 mm to 110 mm. In addition, the first scatterer may have a width ranging in size from 5 mm to 2000 mm, such as 10 mm to 1500 mm, such as 15 mm to 1000 mm, such as 20 mm to 500 mm, such as 25 mm to 450 mm, such as 30 mm to 400 mm, such as 35 mm to 350 mm, such as 40 mm to 300 mm, such as 45 mm to 250, such as 50 mm to 150 mm, and including 90 mm to 110 mm. The first scatterer may also have any convenient thickness. For example, the first scatterer may have a thickness ranging from 1 mm to 50 mm, such as 1 mm to 25 mm, and including 1 mm to 15 mm. In select versions, the first scatterer has a thickness of 6 mm.

The first absorber may be any convenient element configured to receive and characterize gamma radiation scattered via Compton scattering in the scatterer. In some embodiments, the first absorber operates via scintillation. In some such embodiments, the absorber includes a crystal and an array of light detectors. Any suitable crystal may be employed. In some instances, the crystal includes sodium iodide. In additional instances, the crystal is thallium-doped. The array of light detectors is positioned adjacent to the crystal and detects scintillated light resulting from the interaction of gamma rays with the crystal. Any suitable light detector may be employed. In some cases, the plurality of light detectors includes one or more photomultiplier tubes (PMTs). The location of the gamma ray can subsequently be determined by processing voltage signals from the PMTs. The number of scintillation photons producing electrical signals in each PMT is inversely related to the distance of the PMT from the point of gamma ray absorption. Detectors involving scintillation that may be adapted for use as the subject absorber are described in, e.g., U.S. Pat. Nos. 3,919,556; 5,841,140; 7,087,903; 7,102,138; 7,394,072; 8,119,980; 8,822,910; and 9,638,811; the disclosures of which are incorporated by reference herein. First absorbers according to embodiments of the invention constitute a plane that is parallel to a plane of the first scatterer.

In certain cases, the first absorber is a semiconductor detector. As is known in the art, semiconductor detectors employ semiconductors to measure incident photons. Any suitable semiconductor detector may be employed. Materials that may be employed in the subject semiconductor detectors include, but are not limited to, silicon, diamond, germanium, cadmium telluride (CdTe), and CZT. In select instances, the first absorber is comprised of CZT. As such, embodiments of the first absorber include CZT detectors. Other embodiments of the first absorber include CdTe. CZT and CdTe detectors that may be adapted for use in the subject first absorber are described in, for example, U.S. Pat. Nos. 8,968,469; 9,000,385; and 10,502,844, the disclosures of which are herein incorporated by reference. In some instances, the semiconductor detectors are pixelated (i.e., are composed of multiple detecting elements). In such instances, the pixels may be of any convenient size, such as where the pixels range in size from 0.25 mm to 5 mm, such as 0.5 mm to 4 mm, such as 0.75 to 3 mm, and including 0.75 to 1.25. In some embodiments, each pixel has a size of 1 mm. The number of pixels in the semiconductor detector may vary, as desired. In certain cases, the number of pixels ranges from 16 to 10000, such as 100 to 2500, and including 625 to 900. Commercially available CZT detectors that may be employed as the first absorber are manufactured by, for example, Kromek Group plc., and General Electric.

The first absorber may have any convenient size. For example, the first absorber may have a length ranging in size from 5 mm to 2000 mm, such as 10 mm to 1500 mm, such as 15 mm to 1000 mm, such as 20 mm to 500 mm, such as 25 mm to 450 mm, such as 30 mm to 400 mm, such as 35 mm to 350 mm, such as 40 mm to 300 mm, such as 45 mm to 250, such as 50 mm to 150 mm, and including 90 mm to 110 mm. In addition, the first absorber may have a width ranging in size from 5 mm to 2000 mm, such as 10 mm to 1500 mm, such as 15 mm to 1000 mm, such as 20 mm to 500 mm, such as 25 mm to 450 mm, such as 30 mm to 400 mm, such as 35 mm to 350 mm, such as 40 mm to 300 mm, such as 45 mm to 250, such as 50 mm to 150 mm, and including 90 mm to 110 mm. The first absorber may also have any convenient thickness. For example, the first absorber may have a thickness ranging from 1 mm to 50 mm, such as 1 mm to 25 mm, and including 1 mm to 15 mm. In select versions, the first absorber has a thickness of 6 mm.

In some embodiments, the first scatterer is also configured to detect photoelectric absorption (PA) caused by gamma radiation from the sample in the analysis region. In other words, in such embodiments, the first scatterer detects incident radiation directly from the sample in addition to providing Compton scattering which is detected by the absorber. Such scatterers are configured for the identification of the location of a gamma interaction, and are suitable for providing proximity imaging. Embodiments of the first scatterer according to these embodiments include a semiconductor detector. Any suitable semiconductor detector that provides for both Compton scattering and proximity imaging may be employed. In some cases, the first scatterer is a CdTe detector. In further cases, the first scatterer is a CZT detector. In some instances, the semiconductor detector of the first scatterer is pixelated (i.e., is composed of multiple detecting elements). In such instances, the pixels may be of any convenient size, such as where the pixels range in size from 0.25 mm to 5 mm, such as 0.5 mm to 4 mm, such as 0.75 to 3 mm, and including 0.75 to 1.25. In some embodiments, each pixel has a size of 1 mm. The number of pixels in the semiconductor detector may vary, as desired. In certain cases, the number of pixels ranges from 16 to 10000, such as 100 to 2500, and including 625 to 900. Commercially available CZT detectors that may be employed as the first scatterer are manufactured by, for example, Kromek Group plc., and General Electric.

The first absorber and first scatterer may be positioned at multiple suitable locations with respect to each other. For example, in some embodiments, the first scatterer is separated from the first absorber by a distance ranging from 5 mm to 75 mm, such as 6 mm to 60 mm, such as 7 mm to 50 mm, such as 10 mm to 40 mm, and including 25 mm to 35 mm.

As discussed above, gamma cameras of the invention also include a second detector head including a second scatterer and a second absorber. Any convenient scatterer may be employed in the second scatterer. In some cases, the scatterer is comprised of a high-z material (i.e., element(s) having a high atomic number). Exemplary high-z materials include, but are not limited to, lead, copper and stainless steel. In some cases, the second scatterer comprises CZT. The second scatterer may have any convenient size. For example, the second scatterer may have a length ranging in size from 5 mm to 2000 mm, such as 10 mm to 1500 mm, such as 15 mm to 1000 mm, such as 20 mm to 500 mm, such as 25 mm to 450 mm, such as 30 mm to 400 mm, such as 35 mm to 350 mm, such as 40 mm to 300 mm, such as 45 mm to 250, such as 50 mm to 150 mm, and including 90 mm to 110 mm. In addition, the second scatterer may have a width ranging in size from 5 mm to 2000 mm, such as 10 mm to 1500 mm, such as 15 mm to 1000 mm, such as 20 mm to 500 mm, such as 25 mm to 450 mm, such as 30 mm to 400 mm, such as 35 mm to 350 mm, such as 40 mm to 300 mm, such as 45 mm to 250, such as 50 mm to 150 mm, and including 90 mm to 110 mm. The second scatterer may also have any convenient thickness. For example, the second scatterer may have a thickness ranging from 1 mm to 50 mm, such as 1 mm to 25 mm, and including 1 mm to 15 mm. In select versions, the second scatterer has a thickness of 6 mm.

The second scatterer may be positioned at multiple suitable locations relative to the first scatterer. In embodiments, the second scatterer is located on the opposite side of the analysis region relative to the first scatterer. In some cases, the plane of the second scatterer is parallel to a plane of the first scatterer and a plane of the first absorber. The first scatterer may be separated from the second scatterer by any convenient distance. For example, the first scatterer may be separated from the second scatterer by a distance ranging from 1 mm to 200 mm, such as 5 mm to 150 mm, such as 10 mm to 100 mm, and including 20 mm to 40 mm. In select versions, the distance between the first and second scatterers is adjustable. In some embodiments, the distance separating the scatterers may be adjusted depending on the size of the sample in the analysis region. For example, at least one of the first and second scatterers may be configured to be in contact with the sample in the analysis region.

The second absorber may be any convenient element configured to receive and characterize gamma radiation scattered via Compton scattering in the second scatterer. In certain instances, the second absorber is parallel to the first scatterer. In other words, second absorbers according to embodiments of the invention constitute a plane that is parallel to a plane of the first scatterer. In some embodiments, the second absorber operates via scintillation. In some such embodiments, the second absorber includes a crystal and an array of light detectors. Any suitable crystal may be employed. In some instances, the crystal includes sodium iodide. In additional instances, the crystal is thallium-doped. The array of light detectors is positioned adjacent to the crystal and detects scintillated light resulting from the interaction of gamma rays with the crystal. Any suitable light detector may be employed. In some cases, the plurality of light detectors includes one or more photomultiplier tubes (PMTs). The location of the gamma ray can subsequently be determined by processing voltage signals from the PMTs. The number of scintillation photons producing electrical signals in each PMT is inversely related to the distance of the PMT from the point of gamma ray absorption. Detectors involving scintillation that may be adapted for use as the subject second absorber are described in, e.g., U.S. Pat. Nos. 3,919,556; 5,841,140; 7,087,903; 7,102,138; 7,394,072; 8,119,980; 8,822,910; and 9,638,811; the disclosures of which are incorporated by reference herein.

In certain cases, the second absorber is a semiconductor detector. Any suitable semiconductor detector may be employed. Materials that may be employed in the subject semiconductor detectors include, but are not limited to, silicon, diamond, germanium, cadmium telluride (CdTe), and CZT. In select instances, the second absorber is comprised of CZT. As such, embodiments of the second absorber include CZT detectors. Other embodiments of the second absorber include CdTe. CZT and CdTe detectors that may be adapted for use in the subject first absorber are described in, for example, U.S. Pat. Nos. 8,968,469; 9,000,385; and 10,502,844, the disclosures of which are herein incorporated by reference. In some instances, the semiconductor detectors for use as the second absorber are pixelated (i.e., are composed of multiple detecting elements). In such instances, the pixels may be of any convenient size, such as where the pixels range in size from 0.25 mm to 5 mm, such as 0.5 mm to 4 mm, such as 0.75 to 3 mm, and including 0.75 to 1.25. In some embodiments, each pixel has a size of 1 mm. The number of pixels in the semiconductor detectors suitable for use as the second absorber may vary, as desired. In certain cases, the number of pixels ranges from 16 to 10000, such as 100 to 2500, and including 625 to 900. Commercially available CZT detectors that may be employed as the second absorber are manufactured by, for example, Kromek Group plc., and General Electric.

The second absorber may have any convenient size. For example, the second absorber may have a length ranging in size from 5 mm to 2000 mm, such as 10 mm to 1500 mm, such as 15 mm to 1000 mm, such as 20 mm to 500 mm, such as 25 mm to 450 mm, such as 30 mm to 400 mm, such as 35 mm to 350 mm, such as 40 mm to 300 mm, such as 45 mm to 250, such as 50 mm to 150 mm, and including 90 mm to 110 mm. In addition, the second absorber may have a width ranging in size from 5 mm to 2000 mm, such as 10 mm to 1500 mm, such as 15 mm to 1000 mm, such as 20 mm to 500 mm, such as 25 mm to 450 mm, such as 30 mm to 400 mm, such as 35 mm to 350 mm, such as 40 mm to 300 mm, such as 45 mm to 250, such as 50 mm to 150 mm, and including 90 mm to 110 mm. The second absorber may also have any convenient thickness. For example, the second absorber may have a thickness ranging from 1 mm to 50 mm, such as 1 mm to 25 mm, and including 1 mm to 15 mm. In select versions, the second absorber has a thickness of 6 mm.

In some embodiments, the second scatterer is also configured to detect photoelectric absorption (PA) caused by gamma radiation from the sample in the analysis region. In other words, in such embodiments, the second scatterer detects incident radiation directly from the sample in addition to providing Compton scattering which is detected by the second absorber. Such scatterers are configured for the identification of the location of a gamma interaction, and are suitable for providing proximity imaging. Embodiments of the second scatterer according to these embodiments include a semiconductor detector. Any suitable semiconductor detector that provides for both Compton scattering and proximity imaging may be employed. In some cases, the second scatterer is a CdTe detector. In further cases, the second scatterer is a CZT detector. In some instances, the semiconductor detector of the second scatterer is pixelated (i.e., is composed of multiple detecting elements). In such instances, the pixels may be of any convenient size, such as where the pixels range in size from 0.25 mm to 5 mm, such as 0.5 mm to 4 mm, such as 0.75 to 3 mm, and including 0.75 to 1.25. In some embodiments, each pixel has a size of 1 mm. The number of pixels in the semiconductor detector may vary, as desired. In certain cases, the number of pixels ranges from 16 to 10000, such as 100 to 2500, and including 625 to 900. Commercially available CZT detectors that may be employed as the second scatterer are manufactured by, for example, Kromek Group plc., and General Electric.

The second absorber and second scatterer may be positioned at multiple suitable locations with respect to each other. For example, in some embodiments, the second scatterer is separated from the second absorber by a distance ranging from 5 mm to 75 mm, such as 6 mm to 60 mm, such as 7 mm to 50 mm, such as 10 mm to 40 mm, and including 25 mm to 35 mm.

Figure 1B:
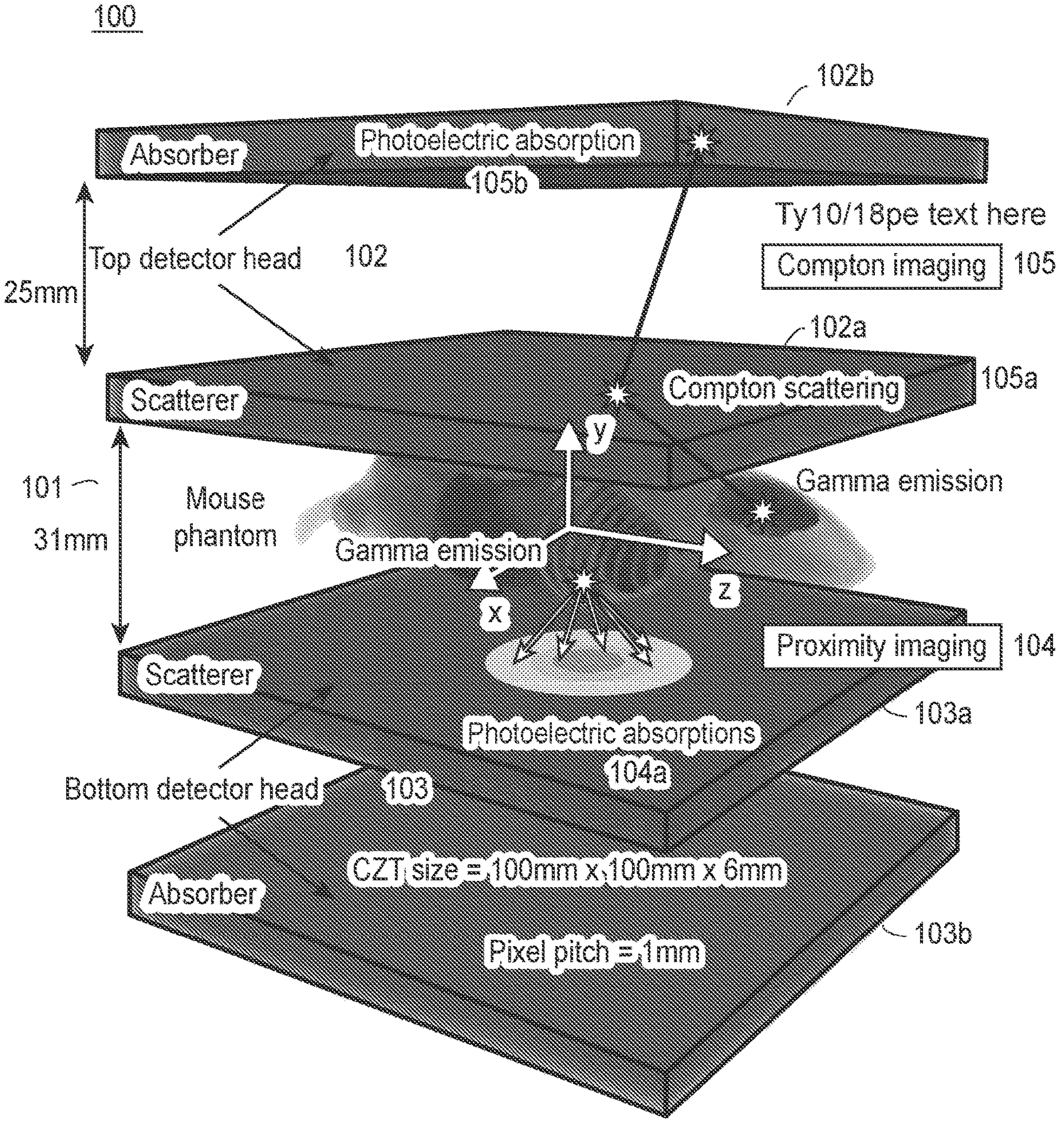

FIG. 1A-1B illustrate embodiments of the gamma camera. As shown in FIG. 1A, gamma camera 100 includes a first detector head 102 and a second detector head 103. First detector head 102 includes a first scatterer 102*a* and a first absorber 102*b*. Second detector head 103 includes second scatterer 103*a* and second absorber 103*b*. First scatterer 102*a* and second scatterer 103*a* flank analysis region 101 configured to receive a biological sample (a mouse in the example of FIG. 1A). First detector head 102 is shown as being parallel to second detector head 103. In addition, the planes of each of first absorber 102*b*, first scatterer 102*a*, second scatterer 103*a* and second absorber 103*b* are parallel to each other.

FIG. 1B illustrates the manner in which gamma camera 100 is configured to perform both Compton imaging and proximity imaging. Gamma emission from the sample in analysis region 101 is analyzed by both Compton imaging 105 and proximity imaging 104. For example, the gamma emission encounters first scatterer 102*a* where it undergoes Compton scattering 105*a*. The scattered photon is absorbed in first absorber 102*b* (i.e., photoelectric absorption 105*b*). While Compton imaging 105 also occurs in the second detector head 103, such is not shown in FIG. 1B. With respect to proximity imaging 104, gamma emission from the sample in analysis region 101 is received in second scatterer 103*a*, where photoelectric absorptions 104*a* occur. While proximity imaging 104 also occurs in first detector head 102, such is not shown in FIG. 1B. Because Compton imaging and proximity imaging are performed simultaneously, the localization of gamma emission within the sample is made possible without a collimator.

Systems

As discussed above, aspects of the invention also include systems. Systems of interest include a gamma camera of the invention (described in detail above), as well as a processor in a signal-receiving relationship with the gamma camera. The subject processors are configured to construct an image based on signals received from the gamma camera. For example, systems include a processor with programmable logic stored thereon or accessible thereto (e.g., in memory or a data storage unit, etc.), where the programmable logic when loaded on the processor includes instructions for receiving signals from the gamma camera, and constructing an image based on the received signals.

By "signal-receiving relationship", it is meant that the processor is connected to one or more components of the gamma camera (e.g., via one or more data transmission lines) such that signals relating to photoelectric absorption are received. In some embodiments, the processor is in a signal-receiving relationship with the first and second absorbers. In additional cases, the processor is also in a signal-receiving relationship with the first and second scatterers (e.g., where the first and second scatterers are semiconductor detectors such as CZT detectors). In some embodiments, the signals received by the processor relate to the gamma ray energy and/or the location (e.g., pixel) where that gamma ray was detected.

Figure 3A:
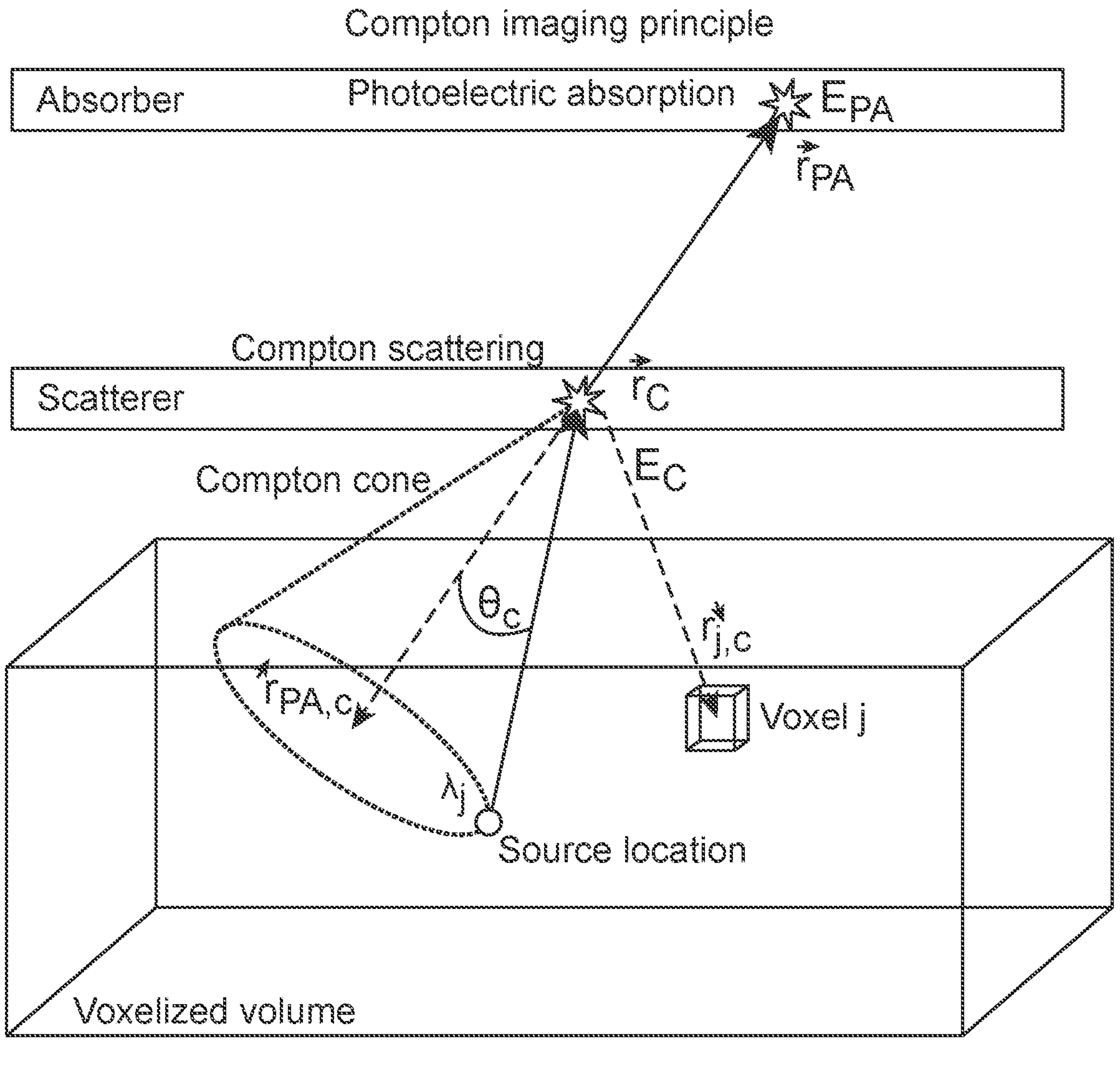
FIG. 3A-3B depict Compton (FIG. 3A) and proximity (FIG. 3B) imaging principles. For the latter, the absorber is not used.

In certain cases, the processor is configured to construct the image based on signals received from Compton scattering. The principle of Compton imaging is shown in FIG. 3A. For example, scattering angle of a gamma ray that undergoes a Compton interaction is determined by the energy of the knocked-out electron, which corresponds to the energy deposited by the Compton electron Ec, and of the energy of the scattered gamma ray, which corresponds to the energy deposited by the outgoing gamma ray after a PA $E_{PA}$, as follows:

$$\cos\theta_C = 1 - \frac{m_e c^2 E_C}{E_{PA}(E_y + E_e)}$$

where $m_e$ is the rest mass of the electron and c is the speed of light in vacuum. In some instances, uncertainties may be present with respect to this angle. In some cases, the uncertainties result from the detector energy resolution and from the unknown energy of the electron in the atom before the interaction (Doppler broadening). As such, in some instances, given the position of the Compton interaction $r_C$ and the position of the photoelectric absorption, the original direction of the incoming gamma ray may be determined to have originated in a certain region in space. In some cases, the region in space is a cone (FIG. 3A).

In some instances, the energy of the incoming gamma ray energy $E_\gamma$ is a priori known. In such instances, the number of parameters in the above-described equation may be reduced by assuming energy conservation, as follows:

$$E_y = E_C + E_{PA}$$

Accordingly, when energy conservation is assumed, the measured Compton angle only depends on one of the observed deposited energies.

In select instances, the processor has instructions stored thereon (or are accessible thereto) which, when executed by the processor, are configured to carry out a reconstruction algorithm that constructs the image using the Compton scattering signals. Any suitable reconstruction algorithm may be employed. In some embodiments, the reconstruction algorithm is a list-mode ordered subset expectation maximization (LM-OSEM) algorithm to reconstruct at least a portion of the image. LM-OSEM is described in, e.g., Ciechanowicz et al. *Parallel Computing: From Multicores and GPU's to Petascale* (Vol. 19, pp. 169-176); and Wilderman et al. *IEEE Transactions on Nuclear Science,* 48 (1), 111-116. The LM-OSEM algorithm discussed herein may take as inputs at least the energy deposited by the Compton electron $E_C$ and scattering angle calculated as discussed above.

Figure 3B:
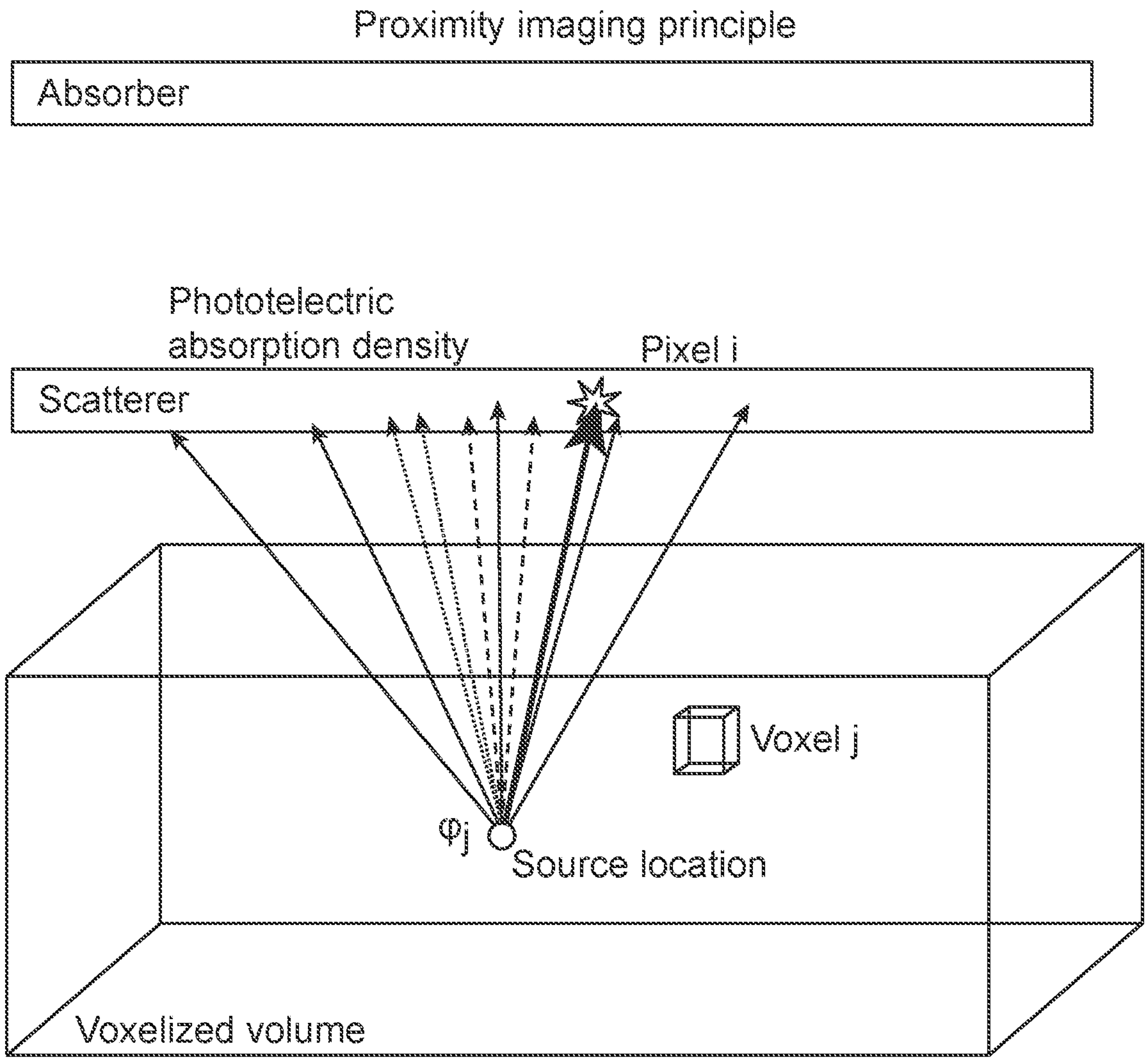

In additional instances, the processor is configured to construct the image based on signals received from proximity imaging. The basic principle of proximity imaging is that the location of a point source can be inferred by the dependence of the gamma ray flux with the inverse of the square root of the distance between the source and the detection point. Gamma ray direction information is not available for this modality, and the imaging power comes exclusively from the density distribution of the detected gamma rays (FIG. 3B). In some cases, the only requirement for proximity imaging is the identification of the location of a gamma interaction in one of the scatterers. In other words, while PA events are theoretically possible in the absorbers, embodiments of the processor are configured to disregard such events with respect to proximity imaging.

In select instances, the processor has instructions stored thereon (or are accessible thereto) which, when executed by the processor, are configured to carry out a reconstruction algorithm that constructs the image using the proximity imaging signals. Any suitable reconstruction algorithm may be employed. In some embodiments, the reconstruction algorithm is an Ordered Subset Expectation Maximization (OSEM) reconstruction algorithm. OSEM is described in, e.g., Rapisarda et al. *Physics in medicine & biology,* 55 (14), 4131; Kadrmas, D. J. *Physics in Medicine & Biology,* 49 (20), 4731; and Reilhac et al. *Neuroimage,* 39 (1), 359-368, herein incorporated by reference.

Figure 2:
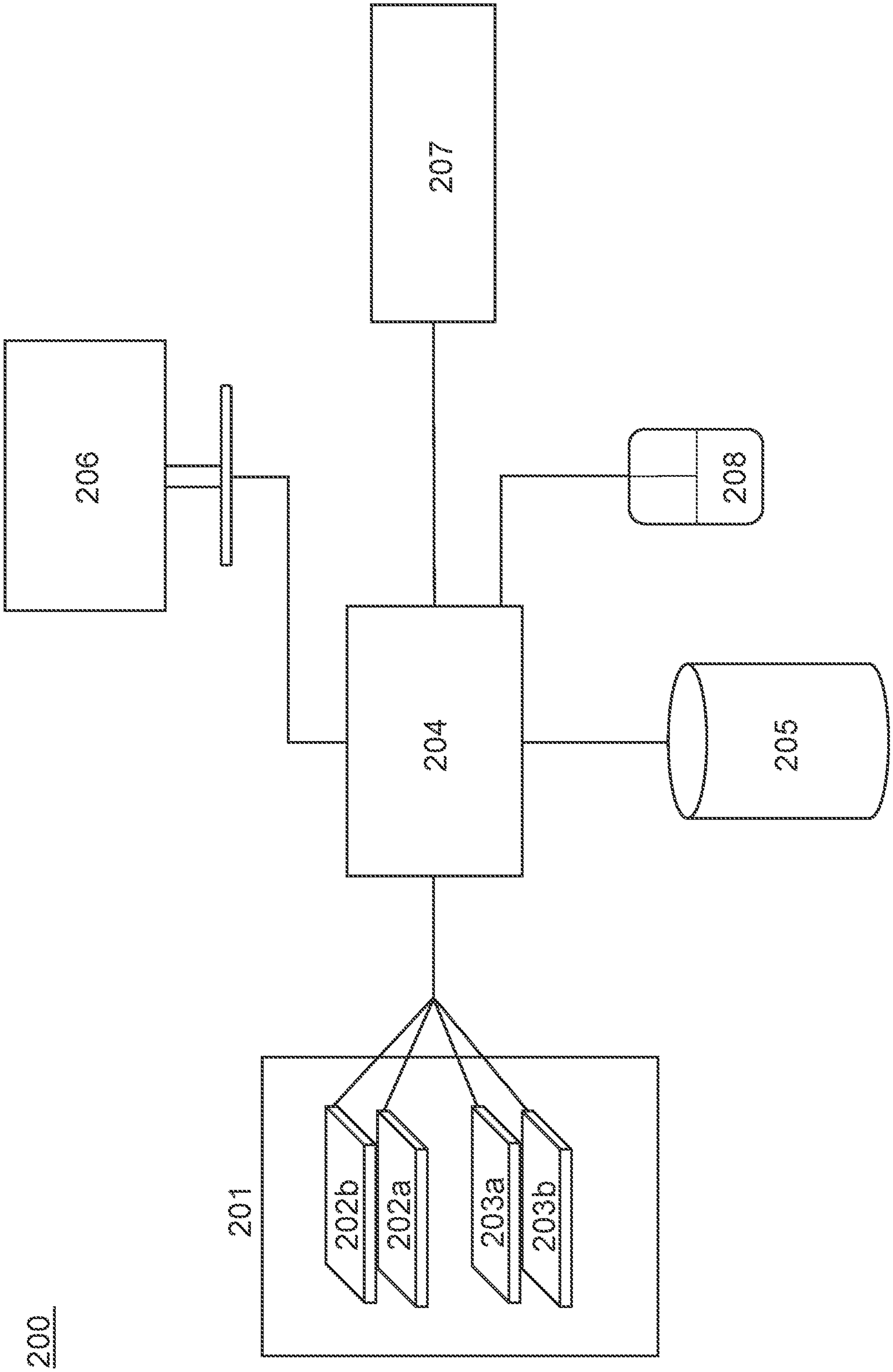
FIG. 2 depicts a system including a gamma camera according to certain embodiments.

FIG. 2 depicts a system according to certain embodiments of the invention. System 200 includes a gamma camera 201 including a first scatterer 202*a*, a first absorber 202*b*, a second scatterer 203*a* and a second absorber 203*b*. Each of the first and second scatterers and absorbers (202*a-b*, 203*a-b*) is configured to transmit signals to processor 204, which is configured to reconstruct an image depicting the location and prevalence of gamma radiation in a sample. Processor 204 is connected to memory 205 having instructions stored thereon for reconstructing an image based on Compton scattering signals and proximity imaging signals. When processor 204 executes these instructions, an image is constructed. The resulting image may likewise be stored in memory 205. Additionally or alternatively, the image may be output to a user. For example, the image may be transmitted (e.g., wirelessly transmitted) from processor 204 to a device of the user's choice (e.g., smartphone, tablet, flash drive, etc.). In addition, the image may be shown on display device (e.g., monitor) 206. The activity of the processor may be controlled by an operator input device. In the example of FIG. 2, the operator input devices include a keyboard 207 and a mouse 208.

Systems may include a display and operator input device. Operator input devices may, for example, be a keyboard, mouse, or the like. The processor may have access to a memory having instructions stored thereon for constructing the image from the received signals. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM i®, Android™, SGI IRIX®, Oracle Solaris® and others.

Methods

Aspects of the invention also include methods of radionuclide imaging. Methods of interest include introducing a radioactive sample into a system comprising a gamma camera of the invention, as well as a processor in a signal-receiving relationship with the gamma camera. As discussed above, processors of the invention are configured to construct an image based on signals received from the gamma camera. Methods also include receiving from the processor the constructed image.

The sample may include any desirable biological sample. In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some cases, the biological sample includes one or more components of an organism, such as organs or tissues. Samples of interest for the subject methods are radioactive (i.e., possessing unstable nuclei). The mechanism by which the biological sample is rendered radioactive may vary, as desired. In some embodiments, the biological sample is employed in a pharmacokinetic (PK) study. In such PK studies, radiopharmaceuticals are applied and their efficacy and toxicity are evaluated over time in small animals (usually mice). In some embodiments, the radiopharmaceutical employed includes $^{225}$Ac. A biological sample exposed to such a radiopharmaceutical may also include $^{221}$Fr, $^{217}$At, $^{213}$Bi and $^{213}$Po, because $^{225}$Ac decays into these. In additional embodiments, the radiopharmaceutical includes $^{227}$Th. However, any biological sample emitting gamma radiation may be imaged using the subject methods.

Utility

The gamma camera disclosed herein can be used for preclinical imaging of extremely low activity radionuclides (e.g., $^{225}$Ac and $^{227}$Th) and for clinical imaging of extremely low activity radionuclides. The camera disclosed herein can be used for in vivo study of pharmacokinetics of targeted alpha therapy radiopharmaceuticals.

The following examples are offered by way of illustration and not by way of limitation.

EXPERIMENTAL

Gamma Camera Design

A system has been designed that enables Compton and proximity imaging at the same time, whose basic design consists of two detector heads set in parallel, where each detector head is made of two CZT parallel planes (FIG. 1A). The principle of Compton imaging requires the detection of a Compton scattering followed by PA. This was enabled in the system by using a scatterer, intended to provide the Compton scattering, and an absorber at the downstream position, intended to provide the PA. By using a high-Z scatterer, a high rate of PAs in a detector in contact with the subject (FIG. 1A) is enabled, which is used in proximity reconstruction. There is also a non-negligible rate of Compton back-scatters that provide a Compton interaction in the absorber and a PA in the scatterer. Despite this, the scatterer-absorber nomenclature will be maintained herein for simplicity.

Monte Carlo Method

A detector model was implemented using the GEANT4-based open software RAT-PAC. The Livermore Physics list was used to model the gamma ray interactions and the electron propagation through the materials. The CZT material was defined as Cd(0.9)Zn(0.1)Te, with mass proportions 0.43:0.03:0.54 (Cd:Zn:Te) and a density of 5.8 g/cm$^3$. Four detector planes were considered, each having the same size of 100 mm 100 mm with a separation between scatterers of 31 mm were, which is the minimum distance that can fit the mouse phantom in an horizontal position. The MOBY 2.0 mouse phantom was imported in GEANT4 using a voxelized model with 196×186×745 voxels of (0.145 mm) and 15 organs (lungs, muscle, intestine, bone marrow, pancreas, brain, heart, kidney, blood, liver, spleen, spine, skull, cortical, rib). The hot rod phantoms were simulated as a cylindrical piece of acrylic with water-filled rods.

The detector response model includes the position and energy resolution. When a gamma ray interaction (Compton or PA) occurs in any detector plane, the centroid of the energy deposition and the amount of deposited energy are recorded for each pixel. The center of the pixel is used as the landscape (XZ) position of the interaction, while the Y (transversal) position is provided by the true Y location of the center of the energy cluster in order to model the depth of interaction (DOI) of the CZT detectors. The nominal DOI in the model is 1 mm full width half maximum (FWHM). The Compton imaging quality heavily depends on the energy resolution. A Gaussian energy resolution model was considered, whose width depends on the square root of the detected energy E, given the Poisson nature of the charge collection in CZT, as follows in Equation 1:

$$\Delta E = 0.065\sqrt{122} \times \sqrt{E}$$

The constant was defined such that a resolution of 6.5% FWHM was simulated at 122 keV. The CZT detection efficiency is not modeled and it was assumed to be 100%. Individual gamma rays of energies corresponding to $^{221}$Fr and $^{213}$Bi were simulated using a particle gun generator. Each MC event corresponds to a single gamma ray, so no pile up was considered, since for extremely low activity sources it is a negligible effect. Contamination of $^{213}$Bi events in the $^{221}$Fr energy window was also considered small and was not simulated.

Image Reconstruction

Two independent image reconstruction algorithms have been implemented, one for each modality. A GPU-accelerated list-mode ordered subset expectation maximization (LM-OSEM) was considered for Compton imaging and a standard ordered subset expectation maximization (OSEM) for proximity.

The scattering angle θc of a gamma ray that undergoes a Compton interaction is determined by the energy of the knocked-out electron, which corresponds to the energy deposited by the Compton electron EC, and of the energy of the scattered gamma ray, which corresponds to the energy deposited by the outgoing gamma ray after a PA $E_{PA}$, as follows in Equation 2:

$$\cos\theta_c = 1 - \frac{m_e c^2 E_C}{E_{PA}(E_y + E_e)}$$

where $m_e$ is the rest mass of the electron and c is the speed of light in vacuum. Uncertainties in this angle come from the detector energy resolution and from the unknown energy of the electron in the atom before the interaction (Doppler broadening). Thus, given the position of the Compton interaction $r_C$ and the position of the PA $r_{PA}$, the original direction of the incoming gamma ray can be constrained to a cone (FIG. 3A). Moreover, if the energy of the incoming gamma $E_\gamma$ is a priori known, the number of parameters in Equation 2 can be reduced by assuming energy conservation, as shown in Equation 3:

$$E_y = E_C + E_{PA}$$

So, the measured Compton angle only depends on one of the observed deposited energies. The identification of which location corresponds to the Compton interaction and which one corresponds to the PA is not trivial. It is assumed that the Compton interaction occurs in the scatterer and that the PA occurs in the absorber, which partially degrades image quality due to the back-scattering events.

The reconstruction of the Compton kinematics is reduced to determining $E_C$, $E_{PA}$, $r_C$ and $r_{PA}$. For this purpose, events were selected that presented energy deposited in a single pixel of the scatterer and an energy deposited in a single pixel of the absorber. The sum of these two energies is required to be larger than 430 keV for $^{213}$Bi imaging and larger than 200 keV for $^{221}$Fr. The rate of back-scatter events after this selection is 21% for Bi and 11% for Fr.

LM-OSEM is a popular reconstruction algorithm used in SPECT that has been previously applied to Compton imaging with good results. The $N^C$ selected Compton coincidence events are randomly sorted in S subsets with approximately the same number $N^C$ of events each. The activity $\lambda_j$ in voxel j is given by the iterative expression (Equation 4):

$$\lambda_j^{k+1} = \frac{\lambda^k}{\varepsilon_j} \sum_{N_s^C} \frac{A_j(E_C, \theta)}{\sum_l A_l(E_C, \theta)\lambda_l^k}$$

where $\lambda_j$ is the activity in voxel j for iteration step k+1, $\lambda_j$ is the activity in the same voxel in the previous iteration step, $\varepsilon_j$ is the Compton sensitivity, defined as the probability of detecting a gamma ray generated in voxel j, $N^C$ is the number of events in subset s, $A_j$ is the Compton system matrix, defined as the probability of detecting a gamma ray generated in voxel j with an energy deposited in scatterer $E_C$ and at an angle θ between the voxel direction $r_{j,C}$ and the scattered gamma direction $r_{PA,C}$ (FIG. 3A). This equation is applied to the subsequent subsets by updating λk with the result of the previous subset. One OSEM iteration corresponds to the application of Equation 4 to every subset in succession. A voxelized volume is defined with voxel centers $r_j$, and voxel size optimized depending on the imaged subject.

Figure 4A:
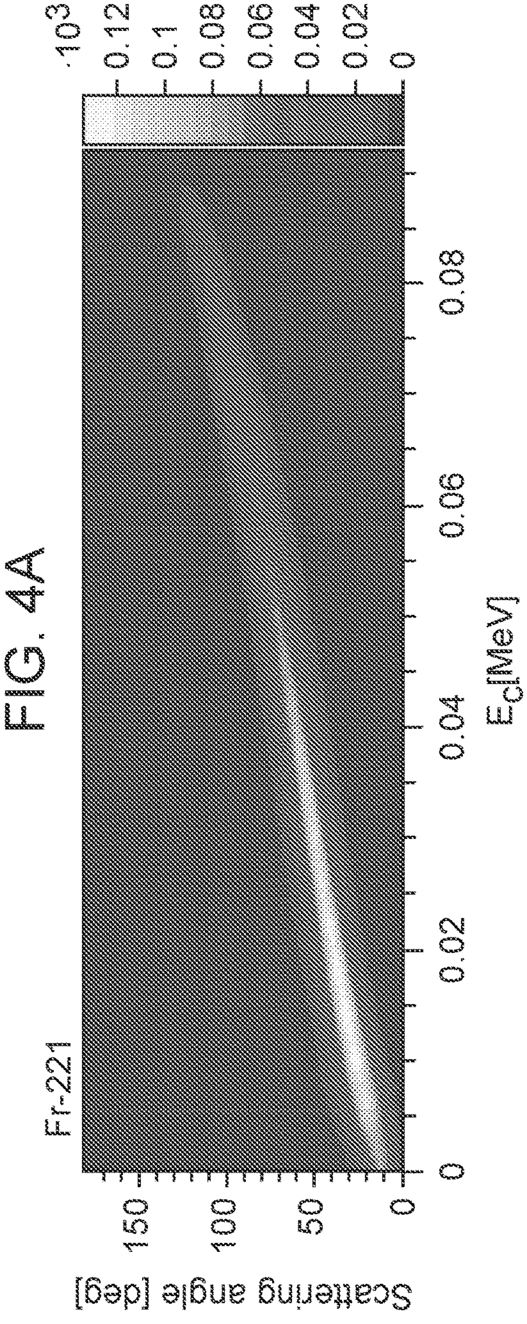
FIG. 4A-4B depict Compton scattering probability as a function of the scattering angle (θ) and the energy deposited in the scatterer (EC) for $^{221}$Fr and $^{213}$Bi. The feature at 180 keV in the $^{213}$Bi figure is due to the back-scattering events.
Figure 4B:
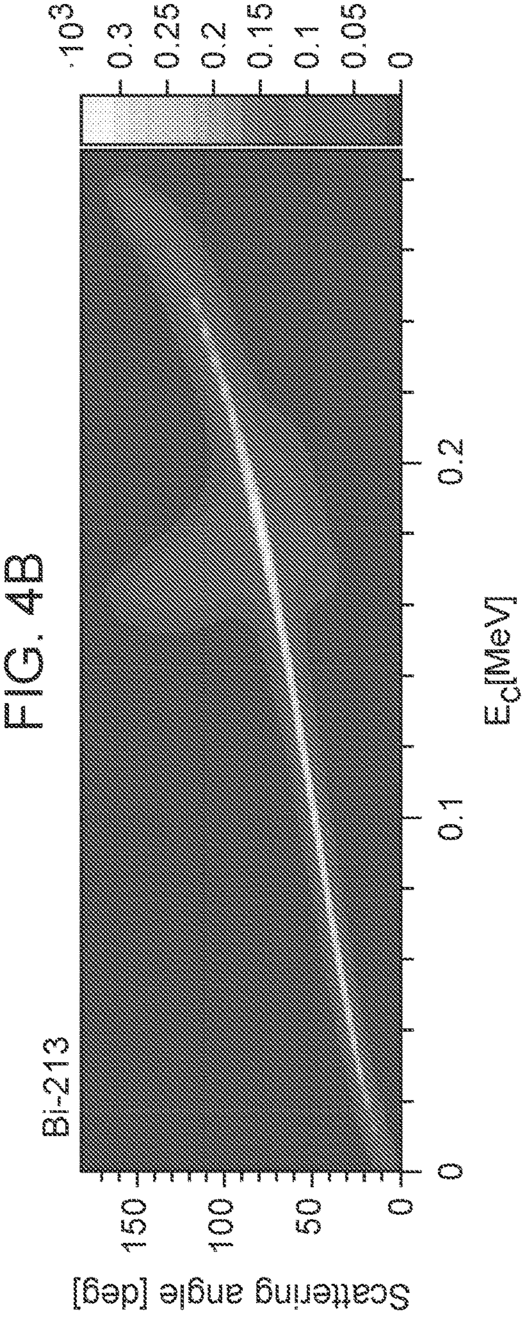

The problem was then reduced to computing $A_j$ and $\varepsilon_j$, which we achieve via MC simulations. 4×109 single gamma ray events are generated at the center of the detector and the event selection defined above was applied. $A_j(E_C, \theta)$ was computed as the number of events in bin $(E_C, \theta)$ divided by the total number of simulated events. The resulting system matrix was illustrated in FIG. 4A-4B. Since the variations of $\varepsilon_j$ within the voxelized volume were small, it was considered constant. This was calculated as the total number of detected gamma rays that pass the event selection divided by the total number of produced gamma rays. The precalculated $A_j$ and $\varepsilon_j$ were used as look-up tables by the reconstruction algorithm. This process is repeated for the two relevant energies (218 keV and 440 keV).

LM-OSEM was further sped up using GPU acceleration. Each $\lambda_j$ was computed in a different core of an NVIDIA TITAN RTX graphics card, accelerating the algorithm by more than two orders of magnitude with respect to a single CPU. $A_j$, $\varepsilon_j$, and the datasets were stored in the GPU memory to reduce memory read and write operations. The algorithm was further accelerated by reducing the voxel space after every iteration, ignoring voxels whose activity drops below 1% of the maximum voxel activity.

The basic principle of proximity imaging is that the location of a point source can be inferred by the dependence of the gamma ray flux with the inverse of the square root of the distance between the source and the detection point. This technique has demonstrated a spatial resolution of 2 cm in planar images of 140 keV gamma rays from $^{99m}$Tc by using a simple geometric mean reconstruction. Gamma ray direction information is not available for this modality, and the imaging power comes exclusively from the density distribution of the detected gamma rays (FIG. 3B).

The only requirement for proximity imaging is the identification of the location of a gamma interaction in one of the scatterers. Given that proximity imaging requires the detector to be very close to the subject to reach a good spatial resolution, PA events were not considered in the absorbers. In order to reduce the scattering background, PA events were selected by requiring single-pixel events with a deposited energy compatible with the expected gamma ray energy (larger than 430 keV and 200 keV for $^{213}$Bi and $^{221}$Fr, respectively).

A non-list mode OSEM is applied for proximity imaging. Sinograms are defined as the number of gamma rays detected in pixel i for both scatterers. The activity in voxel j is calculated iteratively by the expression of Equation 5:

$$\lambda_j^{k+1} = \frac{\lambda^k}{\chi_j} \sum_{Ni} \frac{M_{ij}}{\sum_l M_{il}\lambda_l^k}$$

where $M_{ij}$ is the proximity system matrix, defined as the probability of detecting in pixel i a gamma ray produced in voxel j, $x_j$ is the proximity sensitivity, or probability of detecting a gamma ray from voxel j, and $N_i$ is the total number of bins in the sinogram (which corresponds to the number of total number of pixels in the two scatterers).

In a similar fashion, $M_{i\,j}$ and $x_j$ were calculated by MC simulations. 4×10$^9$ gamma rays were simulated along the Y-axis at the center of the detector and the proximity event selection was applied. The fact that $M_{i\,j}$ is symmetric under XZ translations was relied upon in order to build a look-up table with only events produced along the Y axis. $M_{i\,j}$ was calculated by translating the XZ coordinate to be at the center of the XZ coordinate of voxel j. Since $x_j$ varies little within the imaging region, it was considered a constant, calculated as the total number of gamma rays passing the proximity event selection divided by the total number of generated gamma rays. $M_{i\,j}$ and $X_i$ are computed for the two relevant energies (440 keV and 218 keV). Values of $M_{i\,j}$ were given by interpolating the look-up table values. The algorithm was accelerated by ignoring voxels whose activity drops below 1% of the maximum voxel activity after every iteration.

System Optimization and Characterization

This section is dedicated to optimizing the detector and reconstruction parameters and evaluating the system's performance. Unless otherwise specified, the parameters used in the figures were fixed to the nominal values shown in Table 1:

TABLE 1

Detector parameters chosen to model the system and optimal reconstruction parameters.

| Parameter | Detector model value | |
|---|---|---|
| CZT size | 100 mm × 100 mm | |
| CZT thickness | 6 mm | |
| Scat.-Abs. distance | 25 mm | |
| Pixel size | 1 mm | |
| DOI | 1 mm FWHM | |
| Energy resolution | 6.5% FWHM @122 keV | |
| | Compton reco. | Proximity reco. |
| Voxel size | 1.5 mm | 2 mm |
| # subsets | 10 | 10 |
| # iterations | 10 | 10 |

Figure 5A:
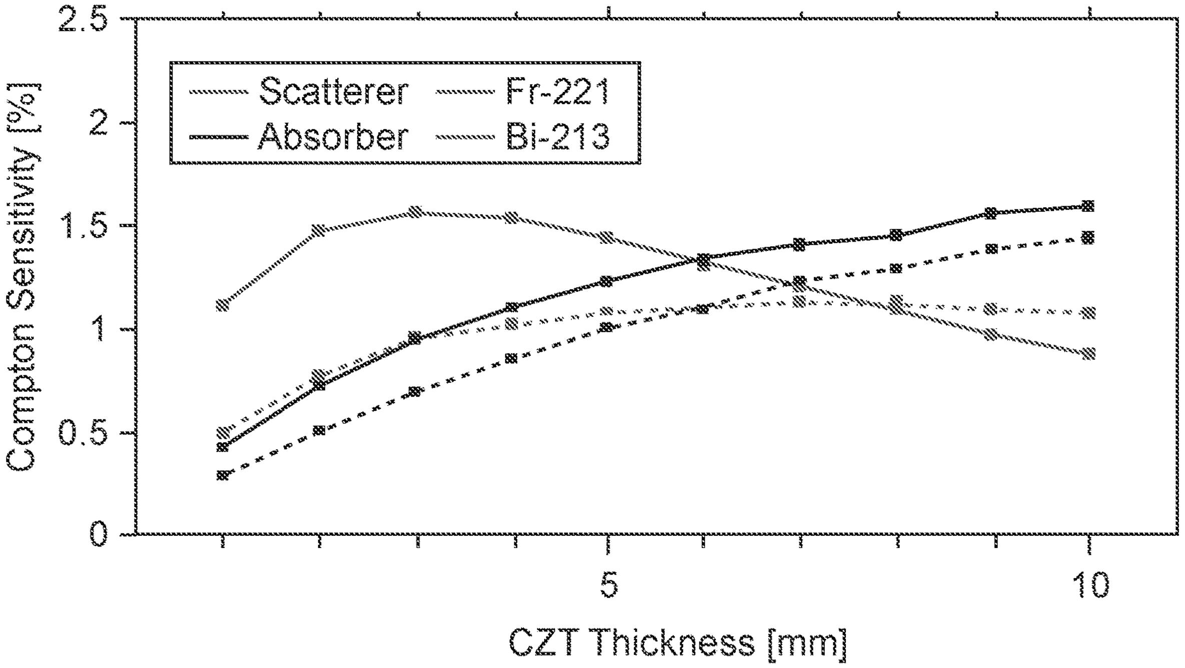
FIG. 5A-5C depict sensitivity to Compton coincidence and proximity events versus CZT detector thickness (FIG. 5A-5B) and absorber-scatterer distance (FIG. 5C).
Figure 5B:
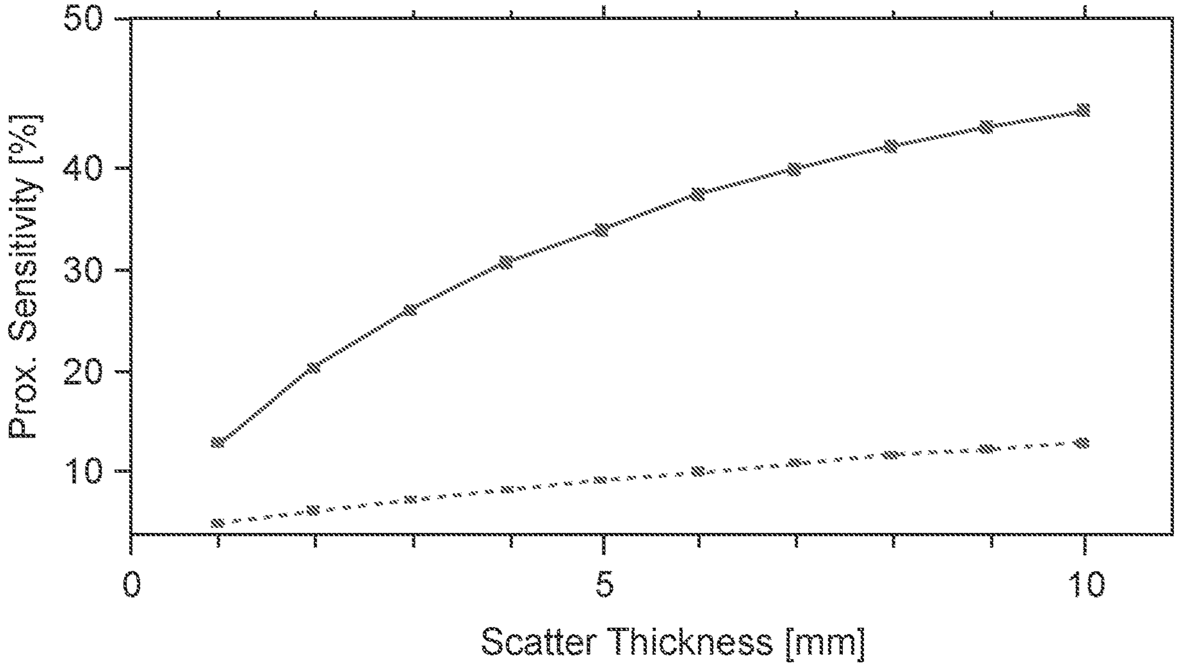
Figure 5C:
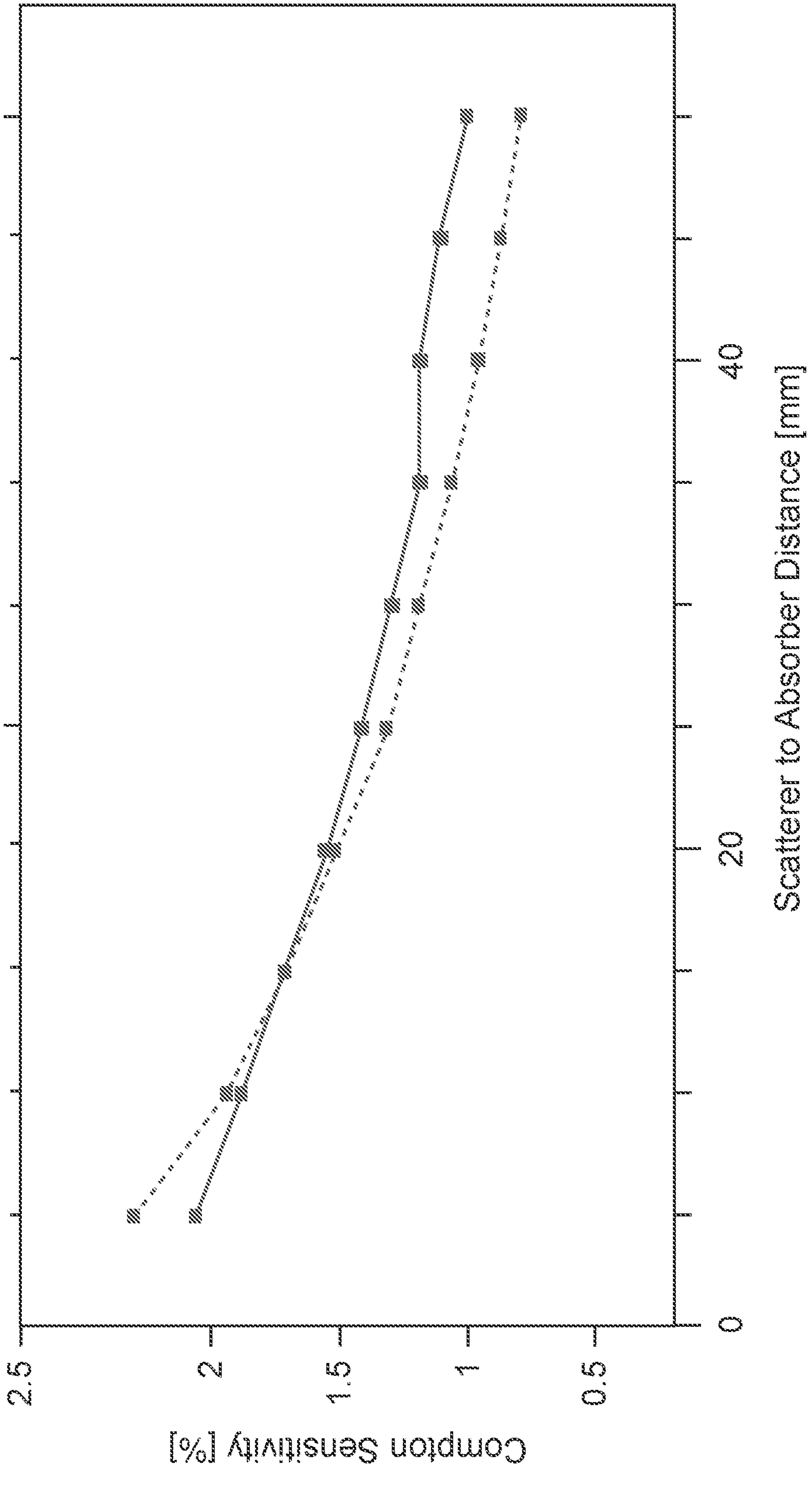
Figure 6A:
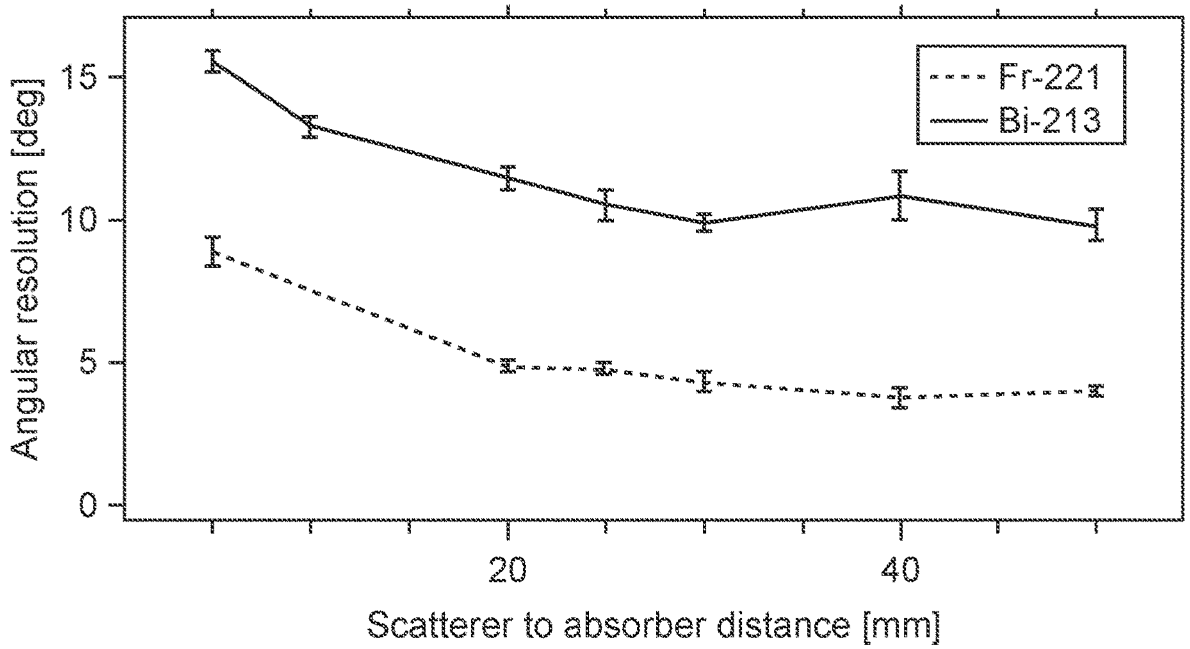
FIG. 6A-6D depict the angular resolution of Compton imaging versus absorber-scatterer distance (FIG. 6A), pixel pitch (FIG. 6B), DOI (FIG. 6C) and energy resolution (FIG. 6D).
Figure 6B:
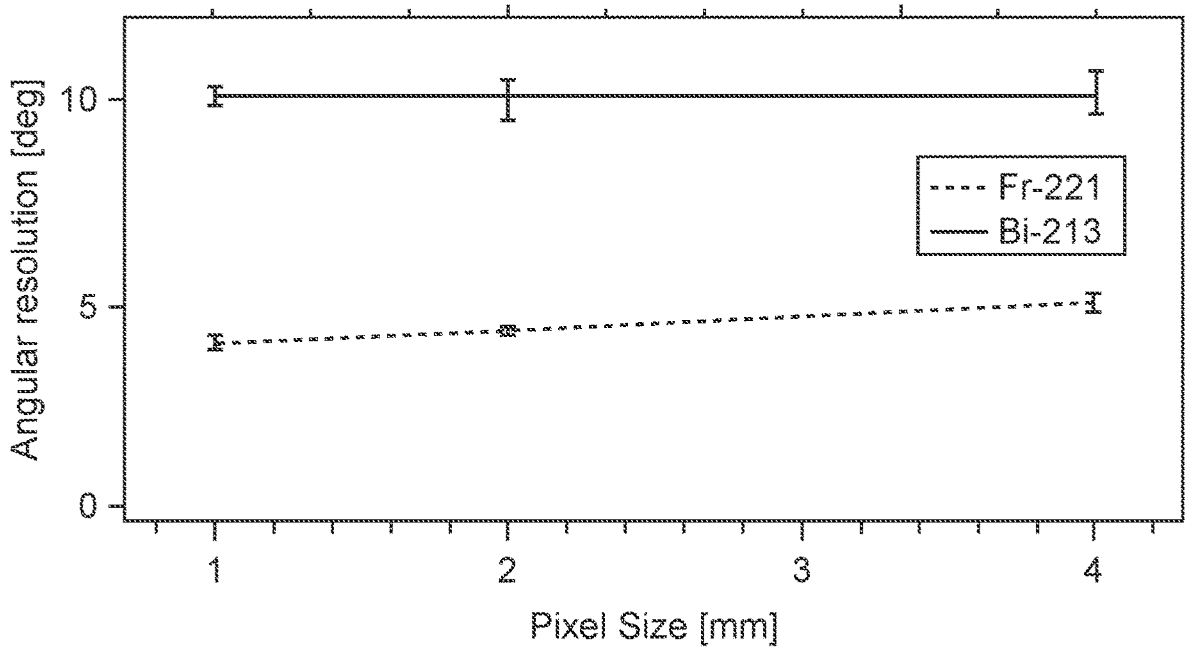
Figure 6C:
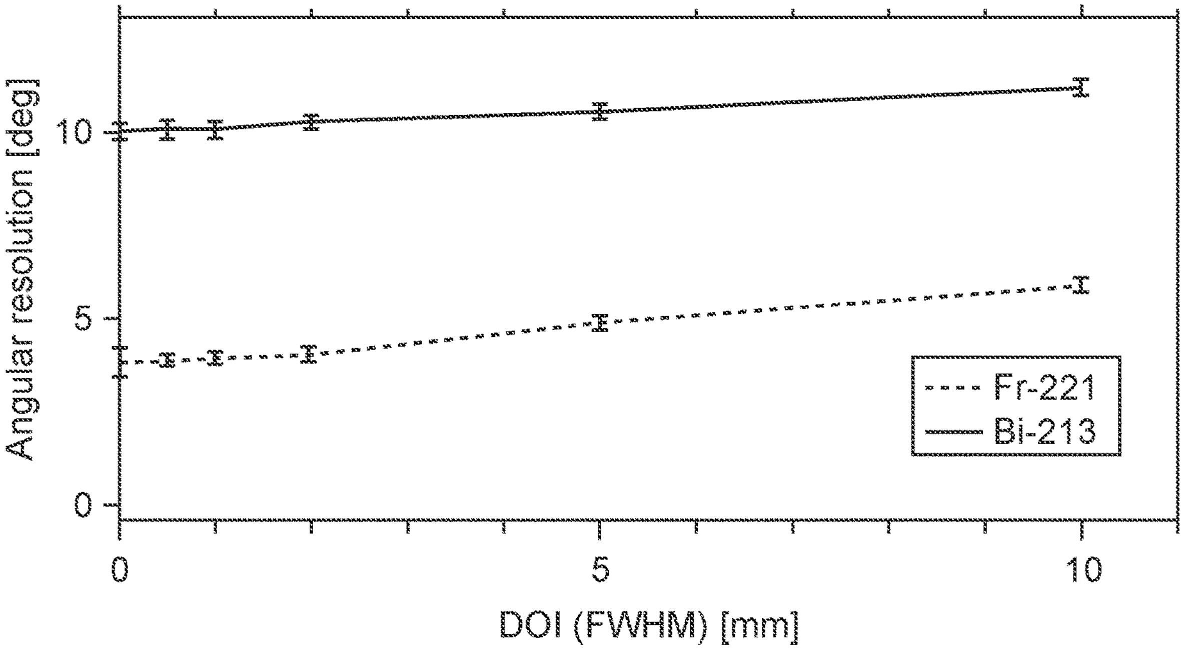
Figure 6D:
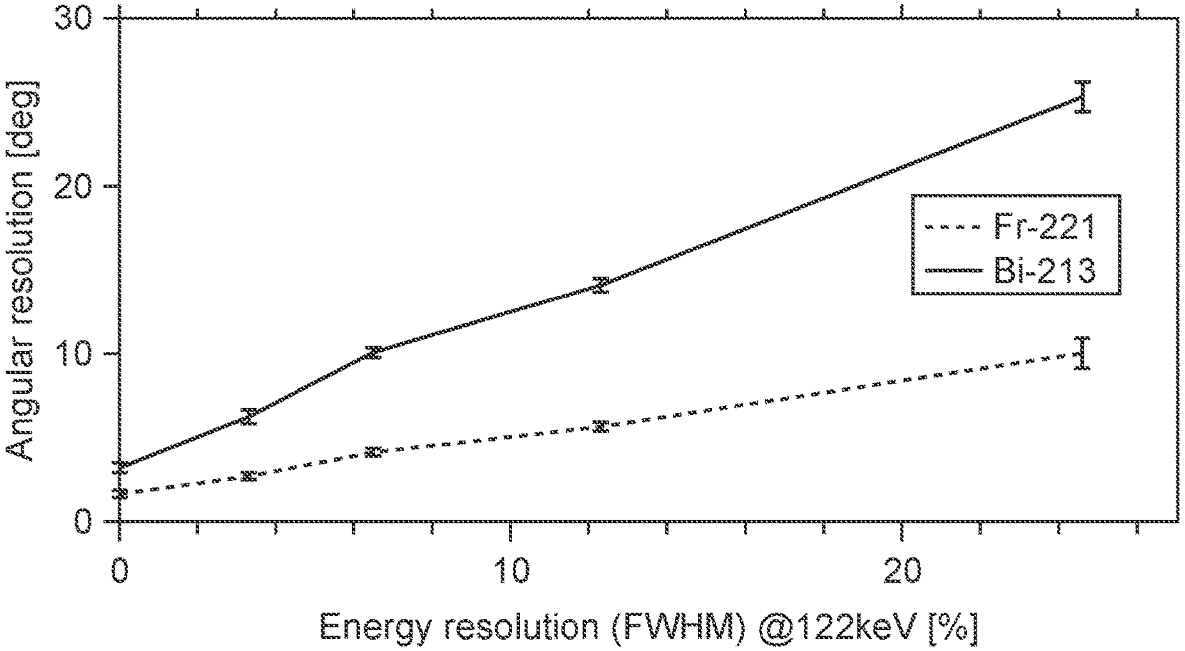

For a fixed-size detector, the CZT thickness is the dominant component of the sensitivity. An isotropic point source at the center of the detector was simulated and the thickness of one of the elements was varied while fixing the other one. The Compton and proximity sensitivities as a function of CZT thickness for each of the detector elements is shown in FIG. 5A-5C. Since the latter does not rely on the absorber, only its dependence with the scatterer's thickness is shown. The Compton sensitivity is proportional to the absorber's thickness, due to the increased CZT stopping power. Regarding the scatterer, the Compton sensitivity reaches a maximum at 3 mm for $^{221}$Fr and 8 mm for $^{213}$Bi, since the probability of a gamma ray to be completely absorbed in the scatterer increases with thickness. The proximity sensitivity increases monotonically with scatterer thickness, as expected given the higher CZT stopping power. 6 mm was chosen as the optimal thickness since it provides a Compton sensitivity above 1% for both energies and isotopes. 6-mm CZT detectors were readily available from commercial sources.

The distance between the scatterer and the absorber also affects the Compton sensitivity, and it also plays an important role on the angular resolution of Compton imaging. The sensitivity to point sources at the center of the detector as a function of the distance is shown in FIG. 5A-5C, where it is observed that it slightly decreases with the distance. On the other hand, the angular resolution improves with distance, as shown in FIG. 6A-6D for point sources at the center. The angular resolution is defined in Equation 6 as:

$$\Delta\theta = \sqrt{(\Delta\theta_C)^2 + (\Delta\theta_d)^2}$$

where $\Delta\theta_c$ is the uncertainty on the determination of the Compton angle and $\Delta\theta_d$ is the uncertainty in the determination of the direction of the scattered gamma ray, $r_{PA}$ $r_C$ (FIG. 3A). The former was calculated as the FWHM of the distribution of the difference between the Compton angle from Equation 2 and the true Compton angle, and the latter was calculated as the FWHM of the difference in the detected direction of the scattered gamma ray, $r_{PA}$ $r_C$, and its true direction. It was chosen to model a distance of 25 mm, which is the first point in the plateau region (FIG. 6A-6D), with angular resolutions of (5.10±0.10°) and (10.70±0.45°) for $^{213}$Bi and $^{221}$Fr, respectively.

The size of the pixel further determines the angular resolution. The angular resolution was computed (Equation 6) as a function of the pixel size. As shown in FIG. 6A-6D, this is rather constant for pixel sizes between 1 mm and 4 mm. 1 mm was set as the default value of the detector model. The dependence of the angular resolution with DOI is shown in FIG. 6A-6D, where a very mild dependence is observed. A DOI of 1 mm FWHM was modeled, which improves the angular resolution (4.20±0.15°) and (10.10±0.21°) for $^{213}$Bi and $^{221}$Fr, respectively. This is a conservative DOI, since smaller ones have been demonstrated in bench-top setups. The energy resolution is a critical parameter for Compton imaging that plays a major role in its angular resolution, as shown in FIG. 6A-6D. CZT has demonstrated excellent energy resolutions of 6.5% FWHM at 122 keV, so we chose that value to model our detector's energy response.

The spatial resolution of each modality as a function of the reconstruction parameters was then computed, namely, the voxel size, the number of subsets and the number of iterations, using a point source at the center of the detector. The spatial resolution was defined as the resolution on the XZ plane (landscape). It was calculated by projecting the reconstructed image on the XZ plane, finding the FHWM contour, and taking the average of the distance between the true position of the point source and sample points over the FWHM contour.

Figure 7A:
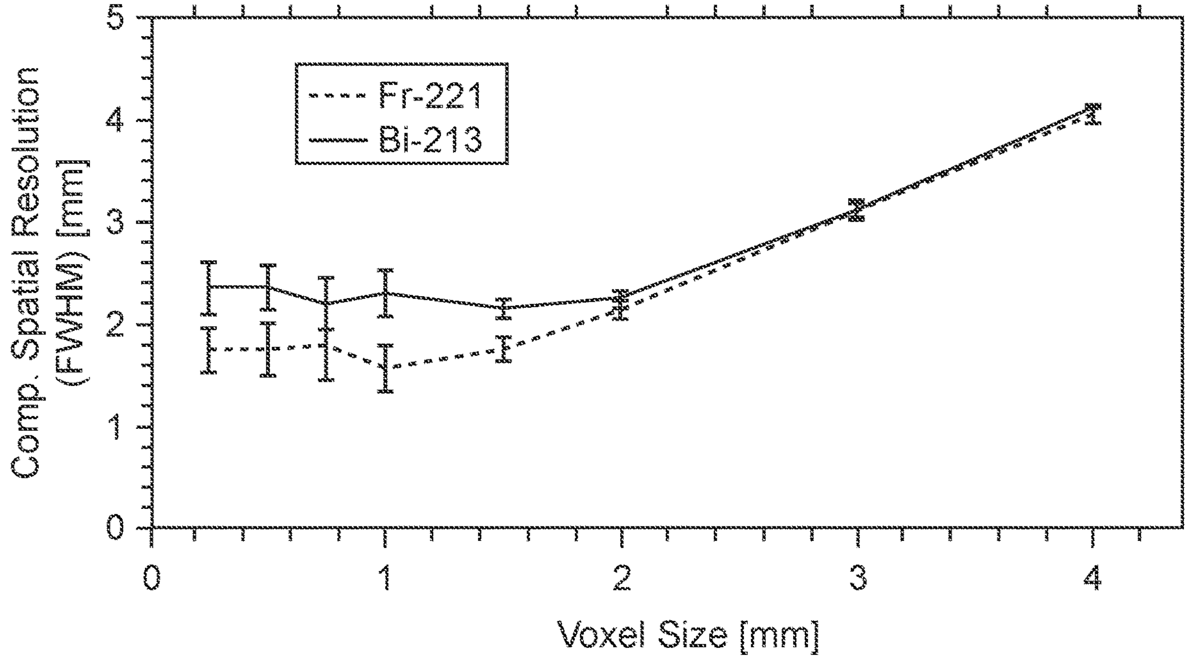
FIG. 7A-7B depict spatial resolution of Compton (FIG. 7A) and proximity (FIG. 7B) imaging versus voxel's size.
Figure 7B:
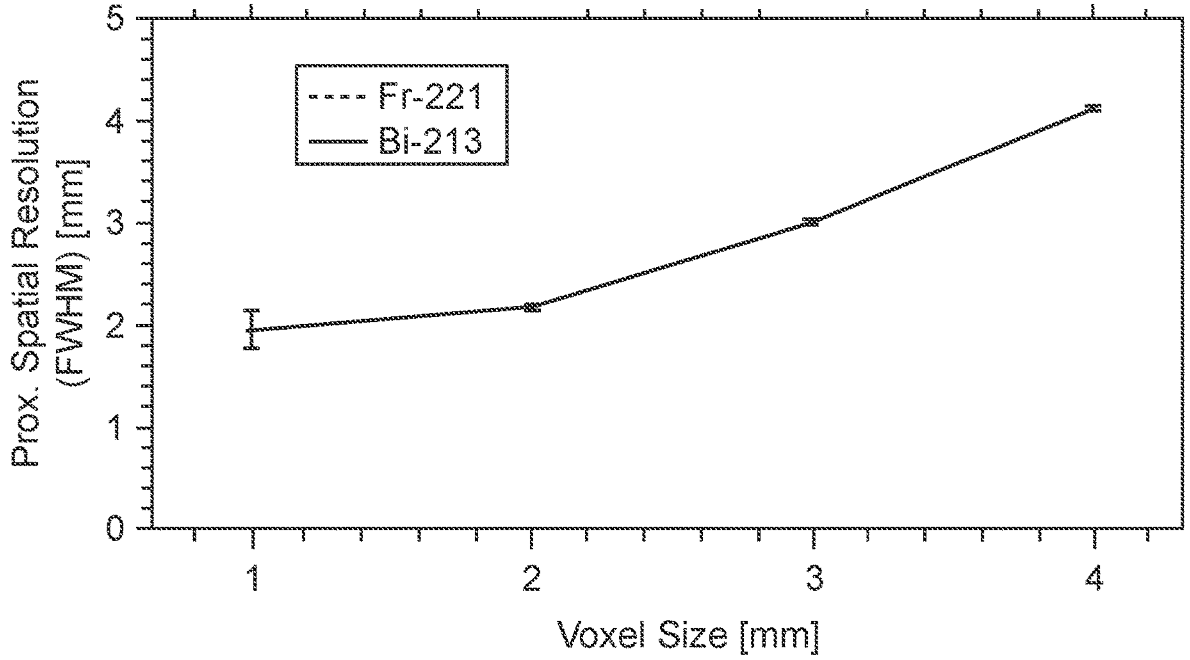
Figure 8A:
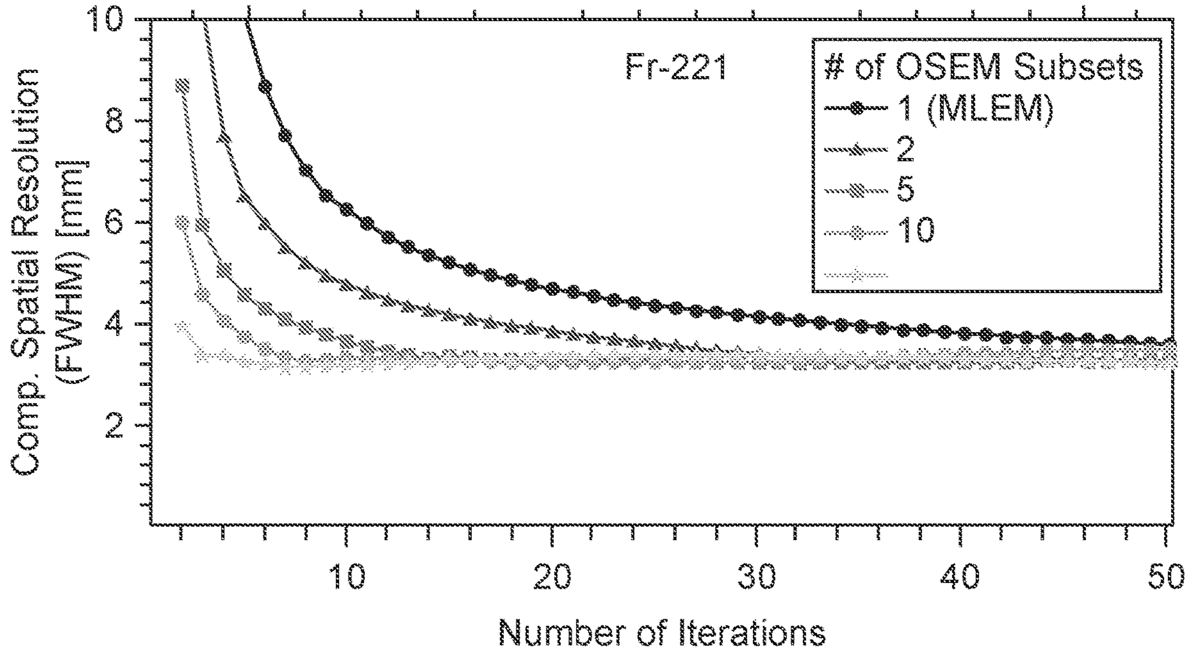
FIG. 8A-8D spatial resolution of Compton (FIG. 8A-8B) and proximity (FIG. 8C-8D) imaging versus number of iterations and number of OSEM subsets.
Figure 8B:
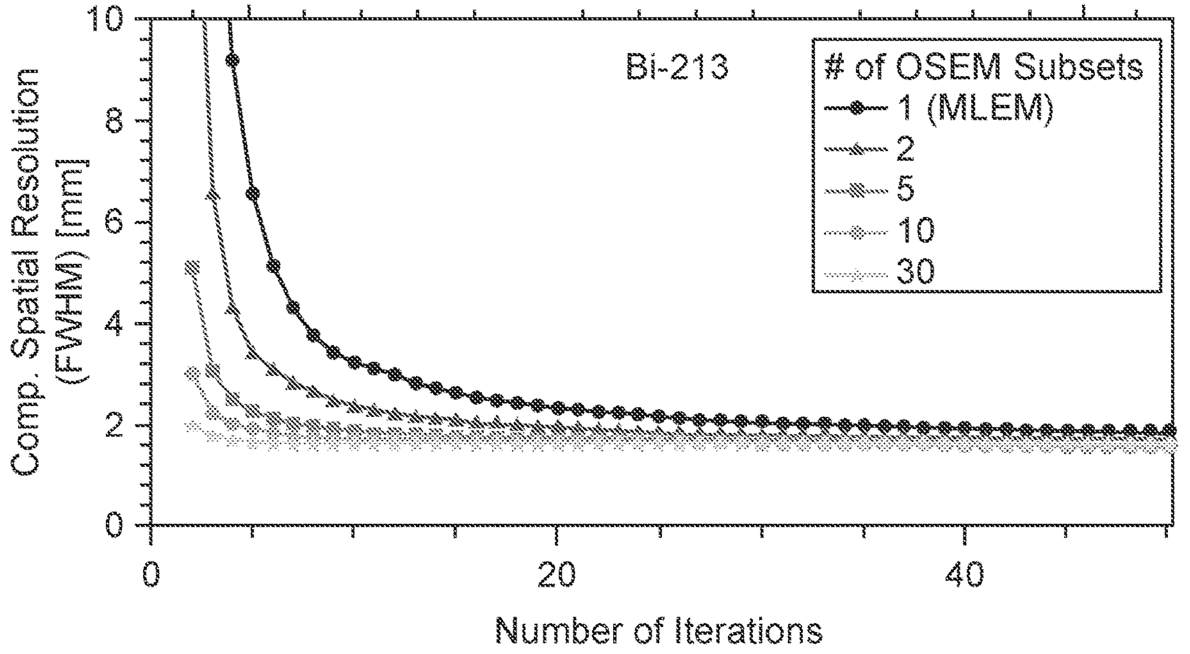
Figure 8C:
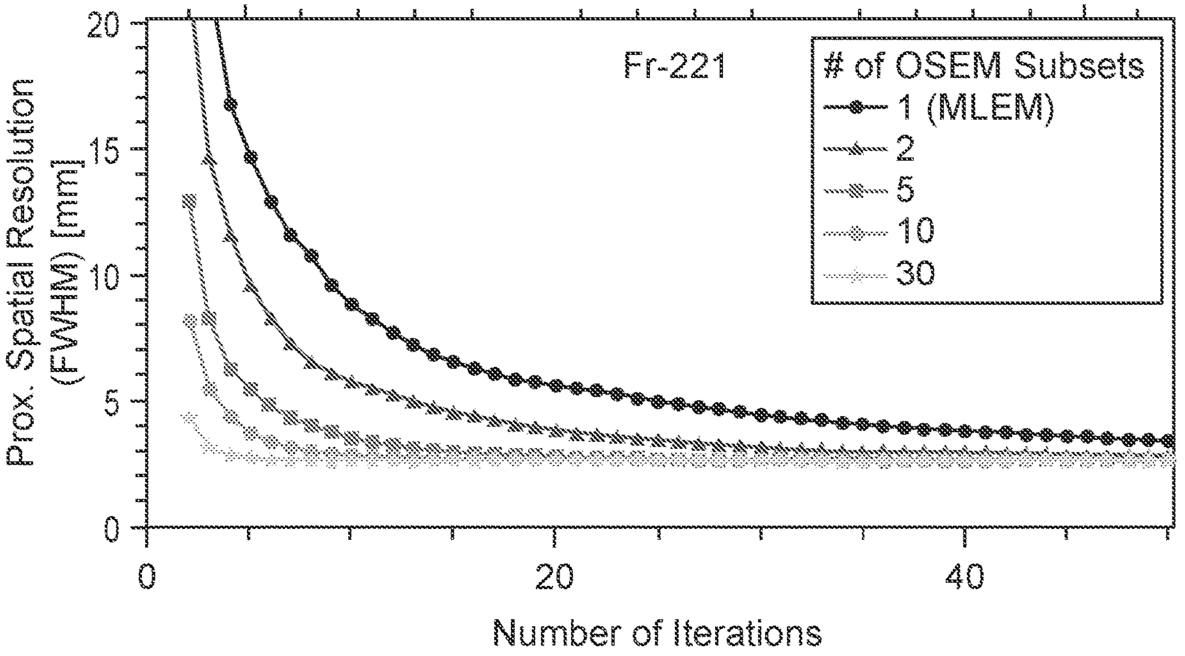
Figure 8D:
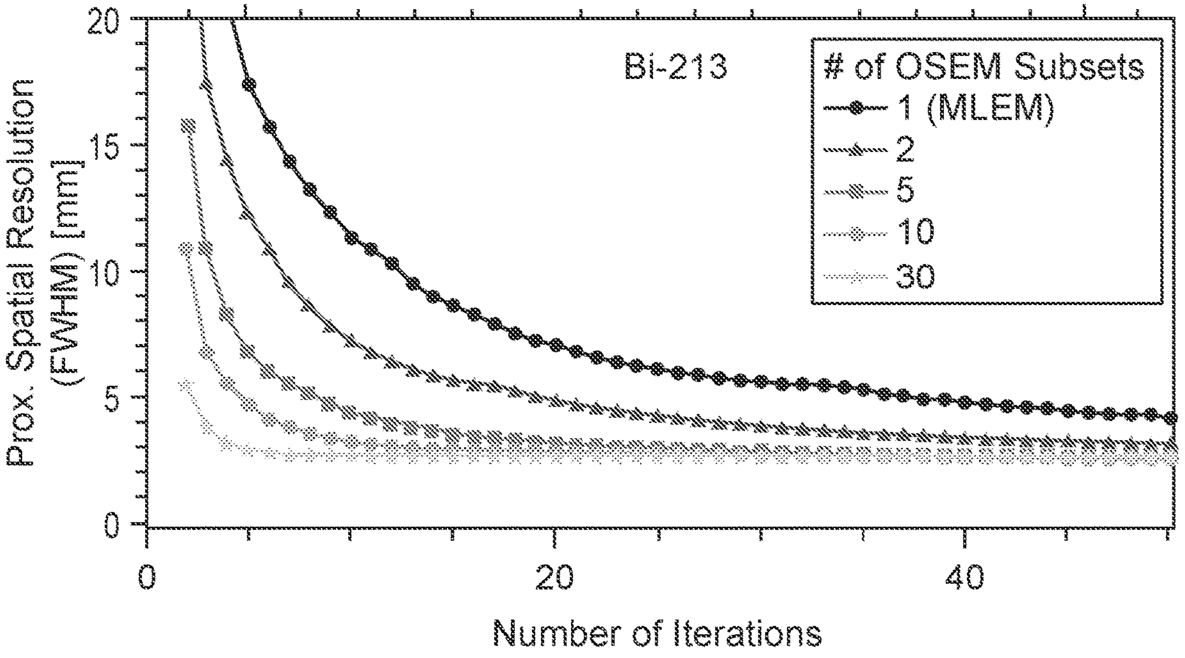

The spatial resolution depends on the voxel size and the speed of the reconstruction depends on the total number of voxels. Since the voxel size determines the total number of voxels for a fixed imaging volume, this introduces a trade-off between performance and speed. The spatial resolution was calculated as a function of the voxel's edge length for cubic voxels in FIG. 7A-7B. The spatial resolution for both modalities plateaus at around 2 mm, so choosing voxels smaller than this value would have a negligible effect on the image reconstruction.

Increasing the number of subsets accelerates convergence of the EM algorithm almost linearly, but it enhances noise since it reduces the number of events in each subset. The spatial resolution was computed as a function of the number of iterations and subsets for each modality (FIG. 8A-8D). Overall, the spatial resolution obtained after a single OSEM iteration with n subsets, is equivalent to n iterations of MLEM. The region of constant spatial resolution was reached for Compton or proximity reconstructions with 10 subsets and after 10 iterations. The optimal number of subsets and iterations was evaluated empirically case by case, since it strongly depends on the size of the subject, the distribution of the activities, and the number of detected counts. A large number of iterations and subsets is not recommended since they can cause noise enhancement, so these numbers were kept low in all cases.

Figure 9:
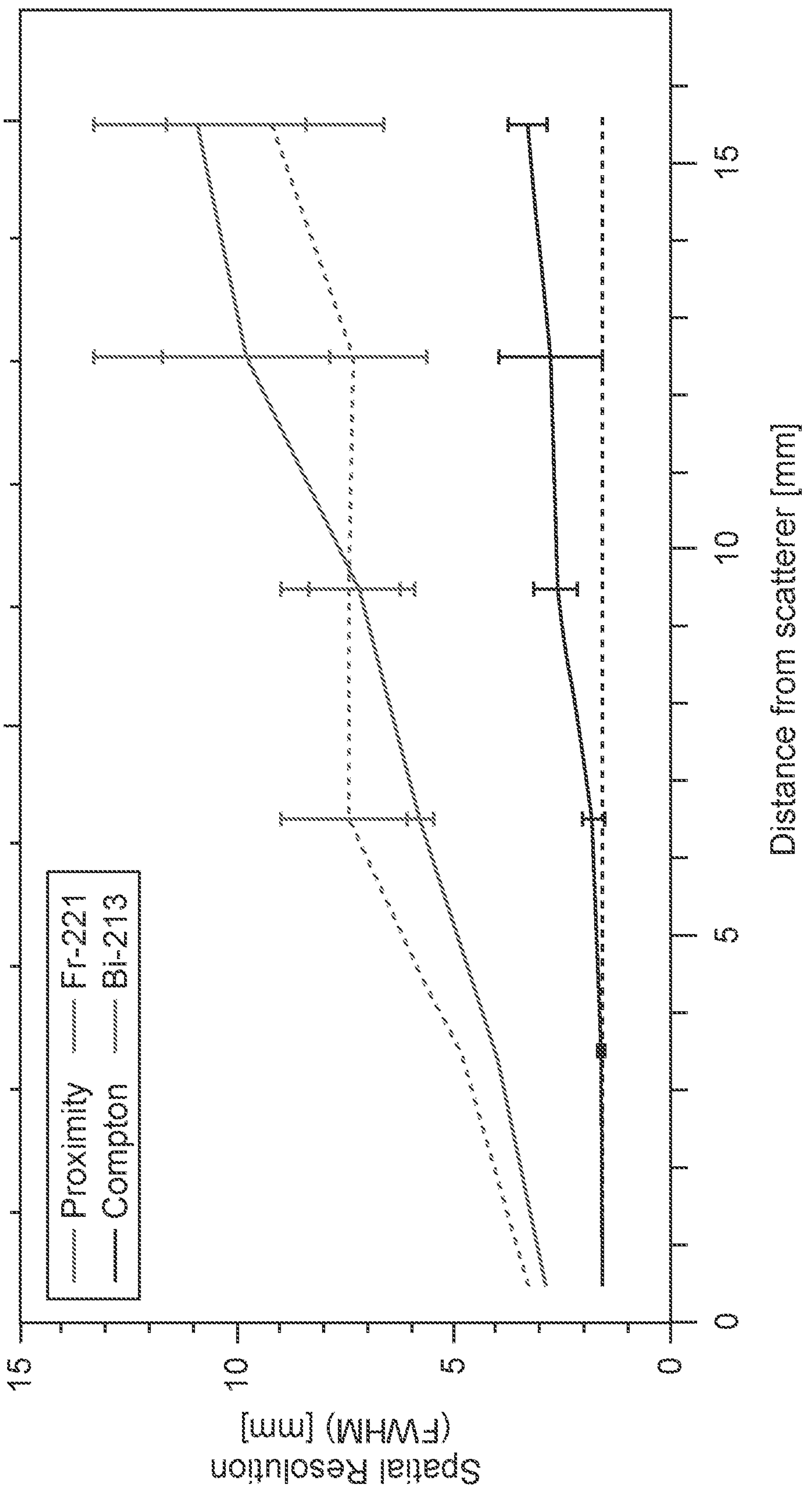
FIG. 9 depicts spatial resolution of Compton (top) and proximity (bottom) imaging as a function of the distance from the scatterer for the optimized detector design.

The spatial resolution of the final optimal detector (Table 1) is calculated as a function of the distance from the scatterer by varying the Y position of a point source (FIG. 9). The best Compton spatial resolution (FWHM) that was achieved is (1.56±0.05) mm for $^{221}$Fr and (1.58±0.03) mm for $^{213}$Bi for a point source at 0.5 mm from the scatterer, and the poorest spatial resolution is (3.28±0.41) mm for $^{221}$Fr and (1.61±0.02) mm for $^{213}$Bi for a point source at the center of the detector (15.5 mm from the scatterer). For proximity imaging, the best resolutions are (2.88±0.01) mm for $^{221}$Fr and (3.22±0.02) mm for $^{213}$Bi, and the poorest are (10.90±2.38) mm for $^{221}$Fr and (9.17±2.48) mm for $^{213}$Bi.

These values do not imply that these modalities can resolve point sources at distances larger than the estimated spatial resolution, since this also depends on the signal-to-noise ratio of the specific images given for each modality, but they serve as figures-of-merit for a first order evaluation of the image reconstruction. The imaging performance with distributions more complex than point source was evaluated and discussed in the Results section below.

Figure 10A:
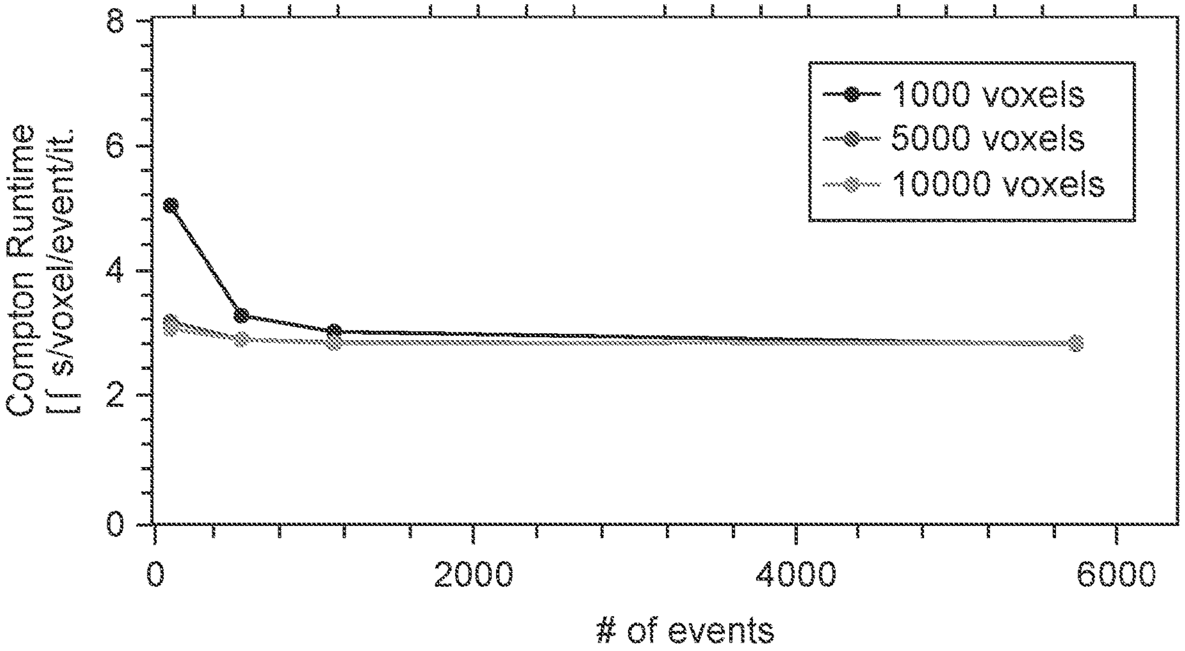
FIG. 10A-10B depict speed of the first iteration of the GPU-accelerated LM-OSEM (FIG. 10A) and OSEM (FIG. 10B) reconstruction algorithms.
Figure 10B:
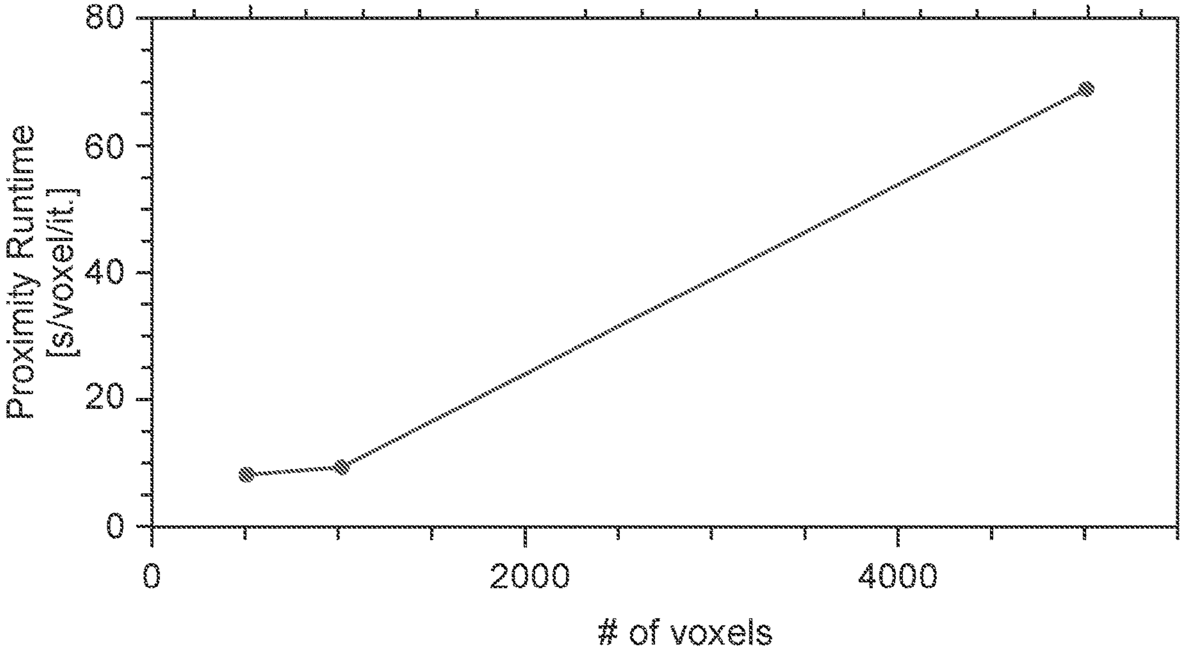
Figure 11A:
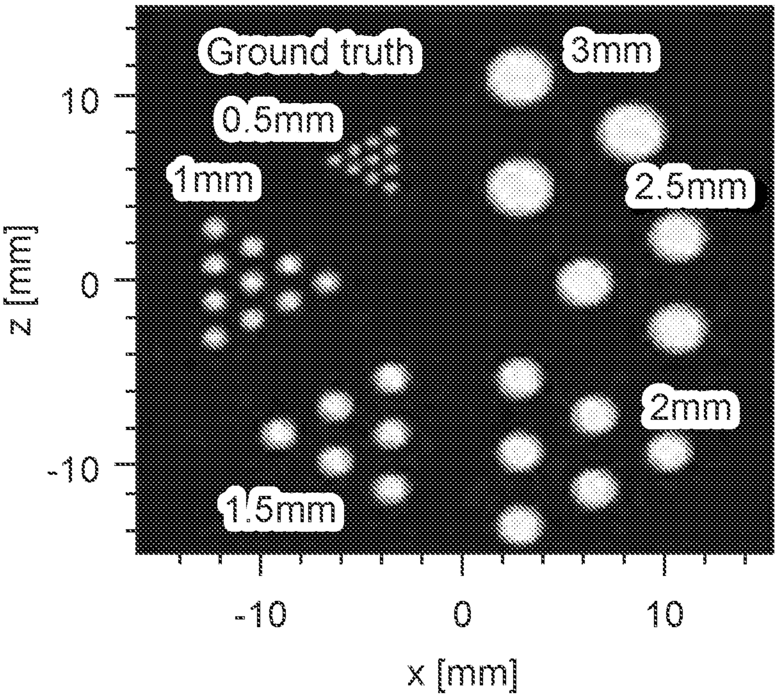
FIG. 11A-11H depict ground truth (FIG. 11A) and Compton-reconstructed images of two micro-Derenzo phantoms with 4 μCi and 1 μCi of $^{225}$Ac at two different positions
Figure 11B:
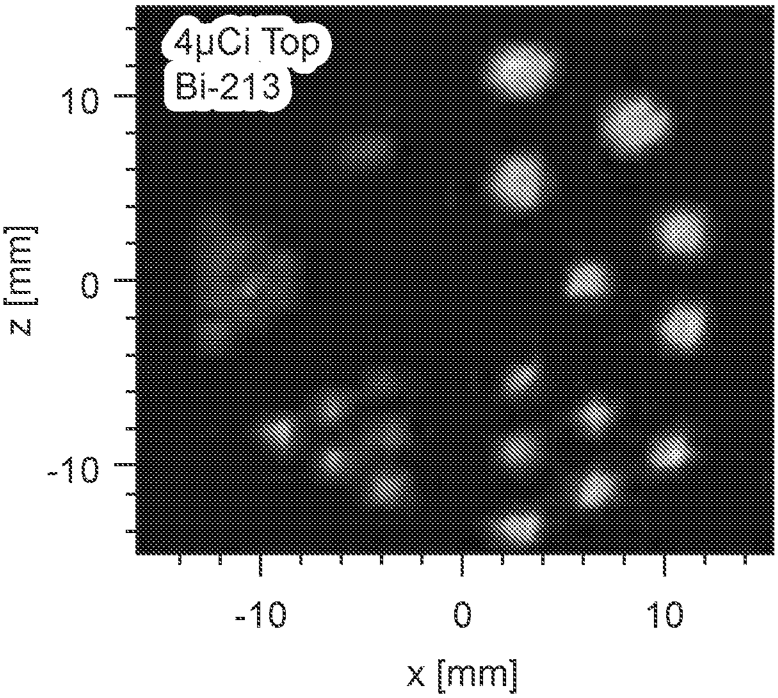
Figure 11C:
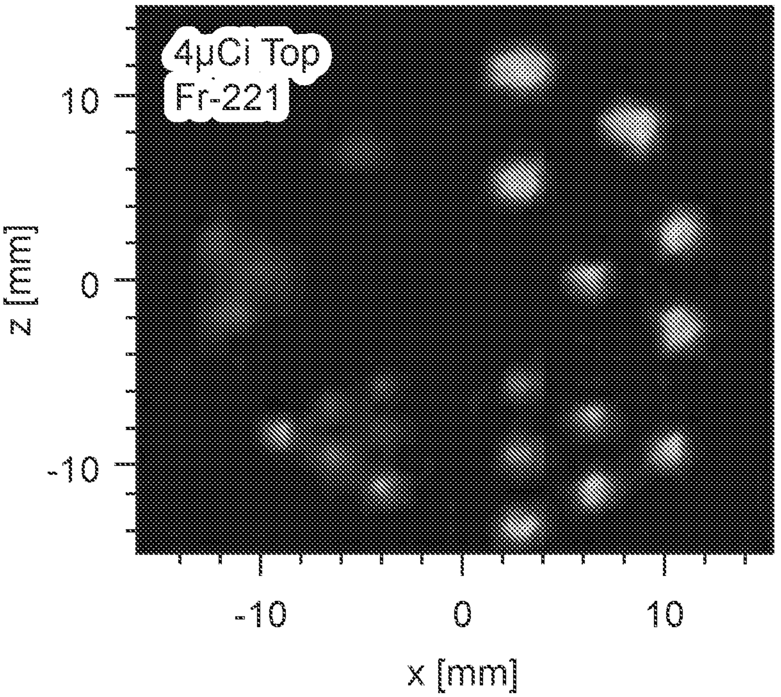
Figure 11D:
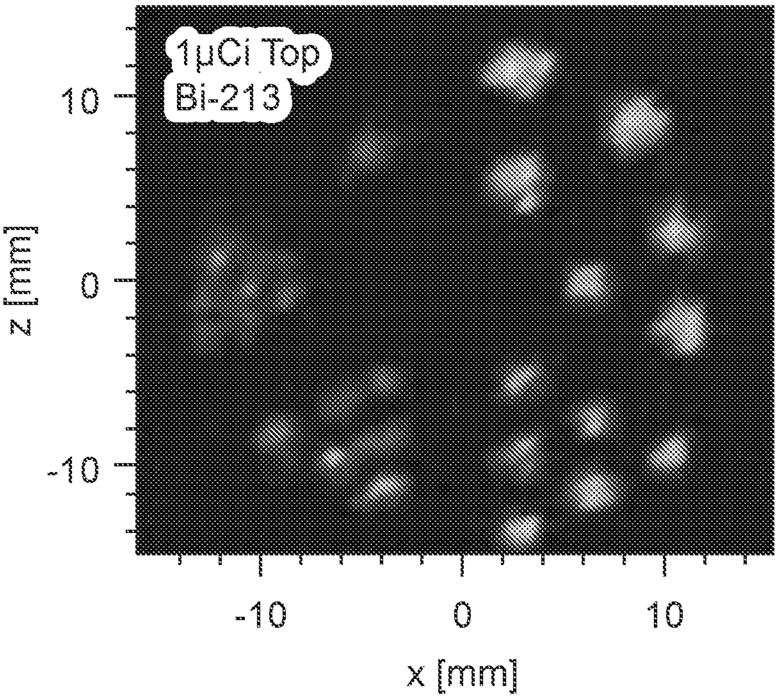
Figure 11E:
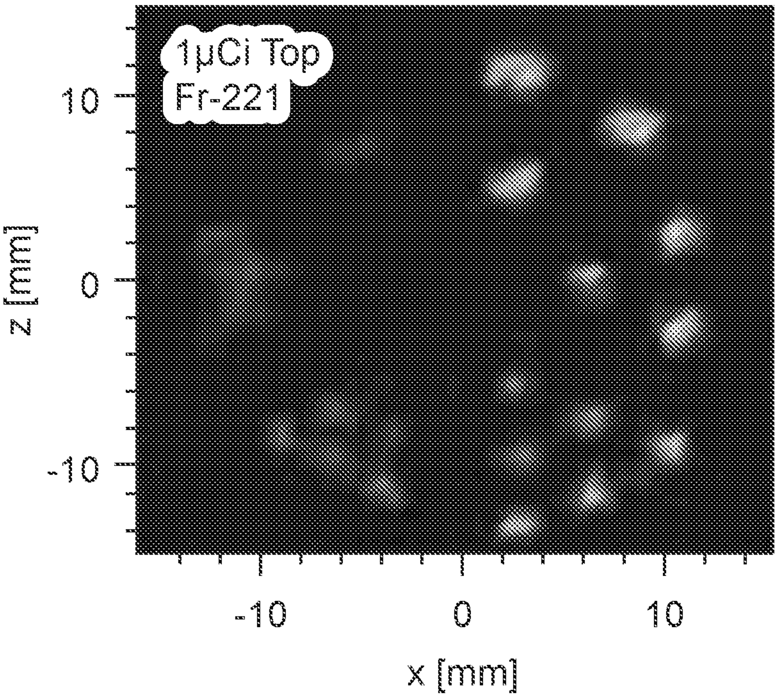
Figure 11F:
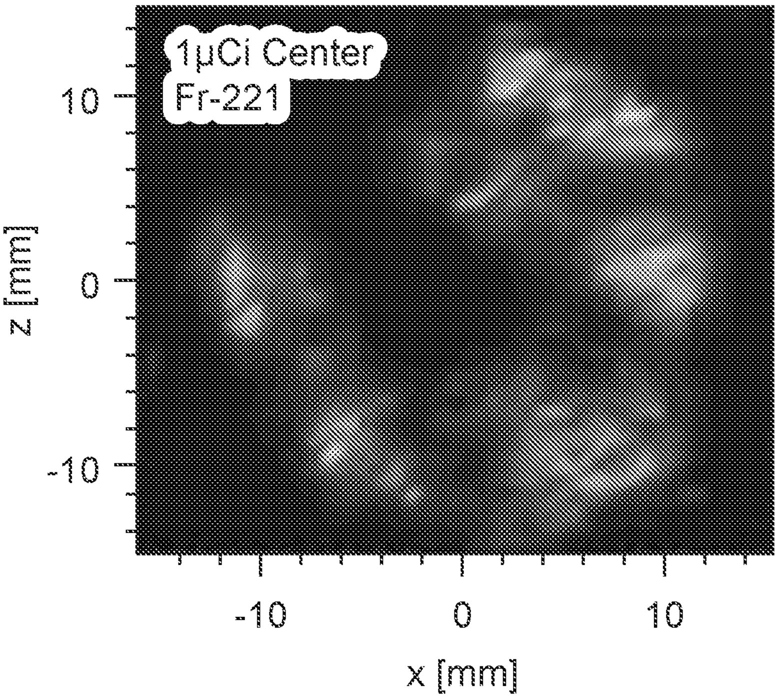
Figure 11G:
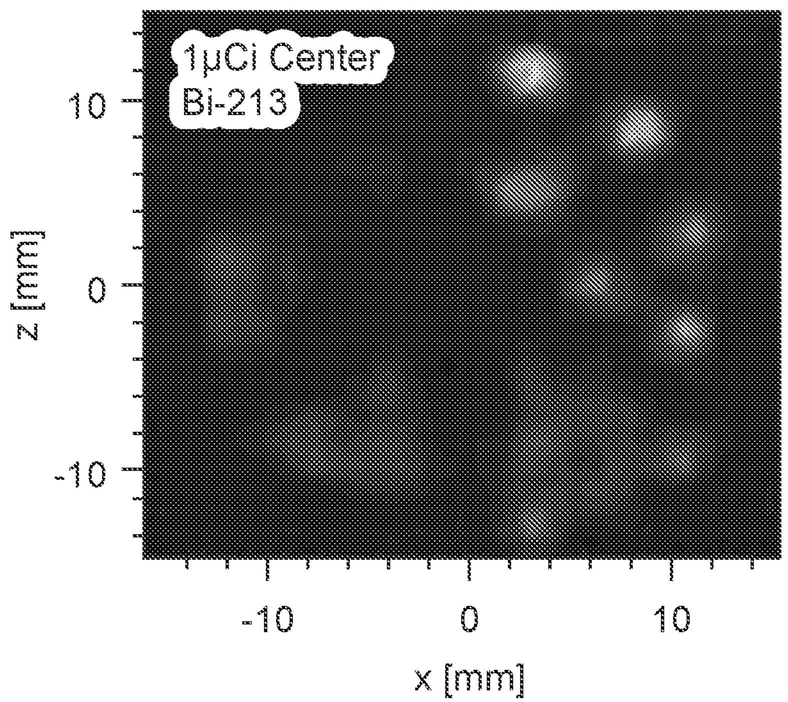
Figure 11H:
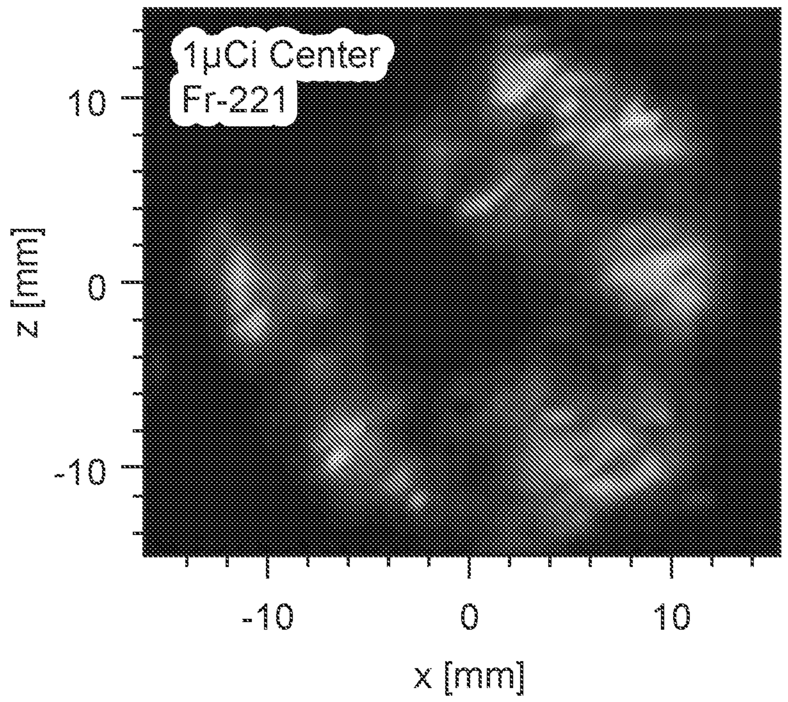

The speed of the reconstruction algorithms was evaluated and is shown in FIG. 10A-B. The GPU-accelerated LM-OSEM implementation can process an image at about 3 us per voxel and per event, when the number of voxels and events are larger than 2000. This is almost three orders of magnitude faster than our implementation of LM-OSEM in a single CPU, which takes 2 ms per voxel and event. For proximity imaging, OSEM is less compute-intensive than LM-OSEM since it is independent on the number of events, so GPU acceleration was not implemented. The speed performance of OSEM is shown in FIG. 10A-10B.

Results

The imaging capabilities of the system were tested with the simulation of two hot rod phantoms and a realistic mouse phantom for different activity scenarios. Images of a micro-Derenzo phantom with 4 μCi and 1 μCi of $^{225}$Ac were reconstructed using Compton imaging. The phantom consisted of a 30 mm diameter acrylic cylinder and 1 mm thickness, with 6 different sets of rods of diameters 3 mm, 2.5 mm, 2 mm, 1.5 mm, 1 mm and 0.5 mm (FIG. 11A-11H). Two different locations were simulated for the phantom: one at 1.0 mm from the scatterer's front face, and another at 15.5 mm (detector center). The simulated exposure is 15 minutes. Compton images using 30 subsets and 10 iterations can resolve the 1.5 mm rods in all cases when the phantom is at 1 mm from the detector. The poorest resolution was obtained at the center of the detector, where the reconstructed images can resolve the 2 mm rods for 4 μCi and the 2.5 mm rods for 1 μCi $^{213}$Bi. Overall, the imaging performance for $^{221}$Fr and $^{213}$Bi got worse as the phantom moved away from the detector and as the activity is lowered (FIG. 11A-11H).

Figure 12A:
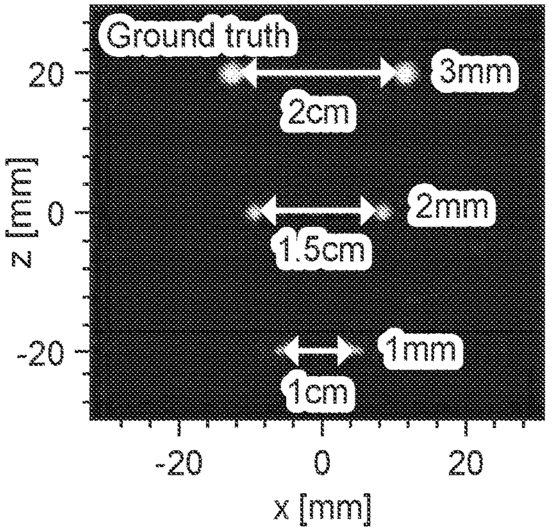
FIG. 12A-12C depict ground truth (FIG. 12A) and proximity-reconstructed images (FIG. 12B-12C) of a custom phantom designed specifically to evaluate proximity imaging. The phantom's activity corresponds to 0.1 μCi of 225Ac and the exposure is 15 minutes. The phantom was located 1 mm from the top scatterer's front face. For these images 2.0 mm voxels, 30 subsets and 1 iteration were used.
Figure 12B:
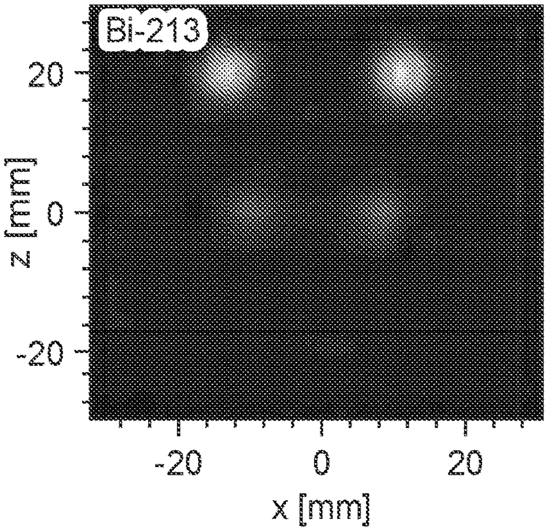
Figure 12C:
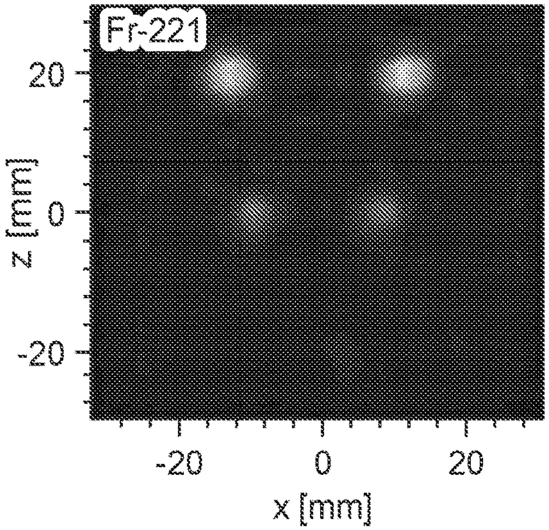
Figure 13A:
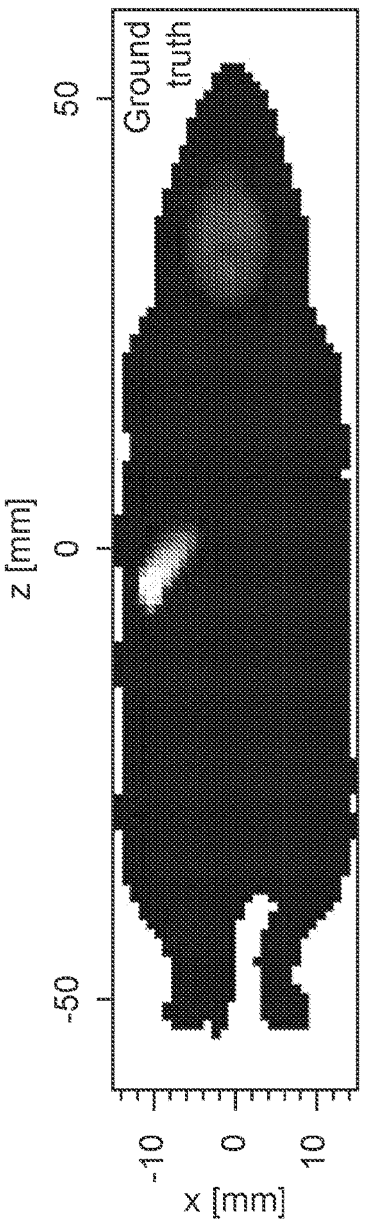
FIG. 13A-13I depict truth and Compton-reconstructed images of a simulated mouse phantom with 0.5 μCi of 225Ac and an exposure of 15 minutes. For these images, 1.5 mm voxels, 10 subsets and 10 iterations were used.
Figure 13B:
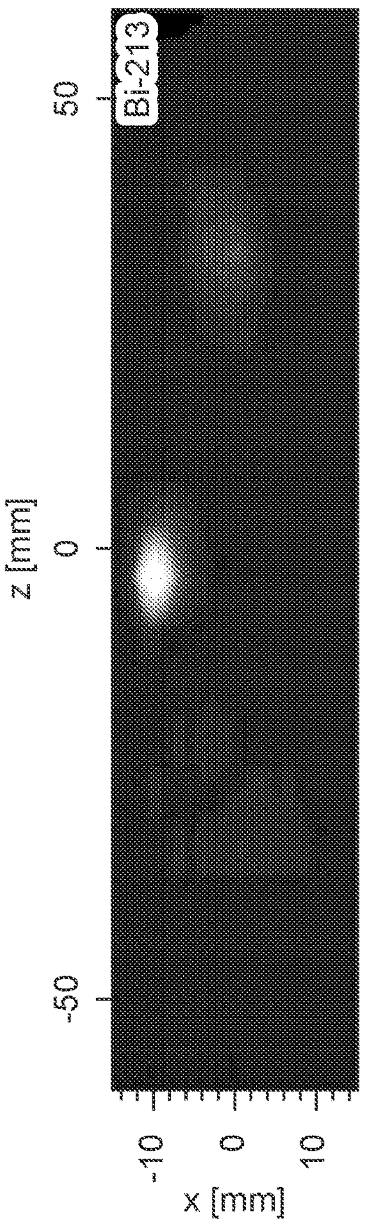
Figure 13C:
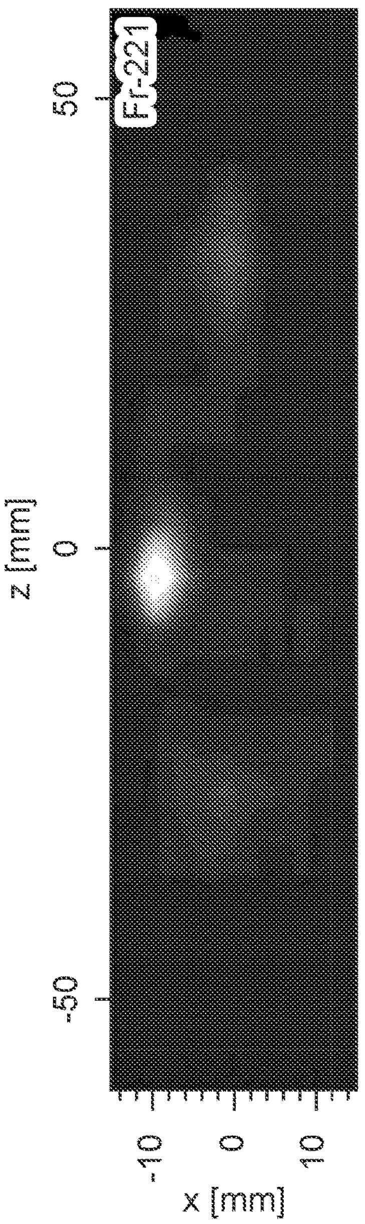
Figure 13D:
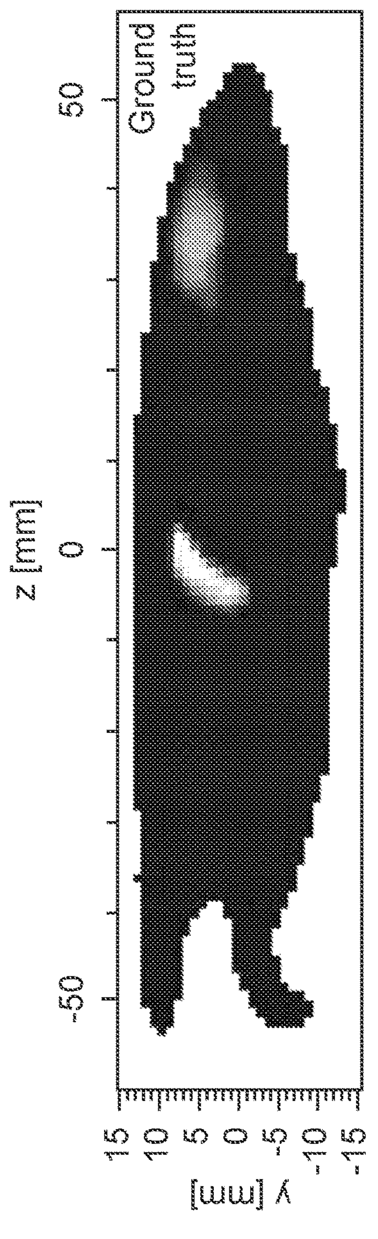
Figure 13E:
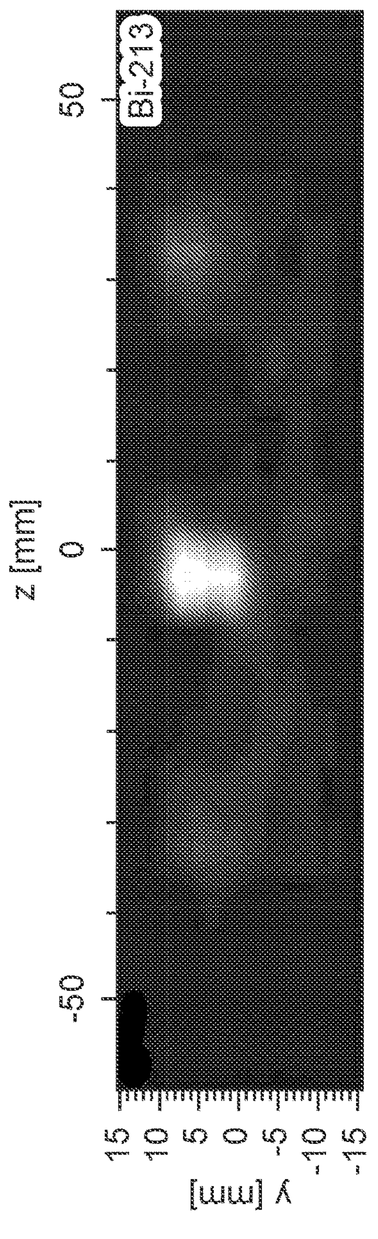
Figure 13F:
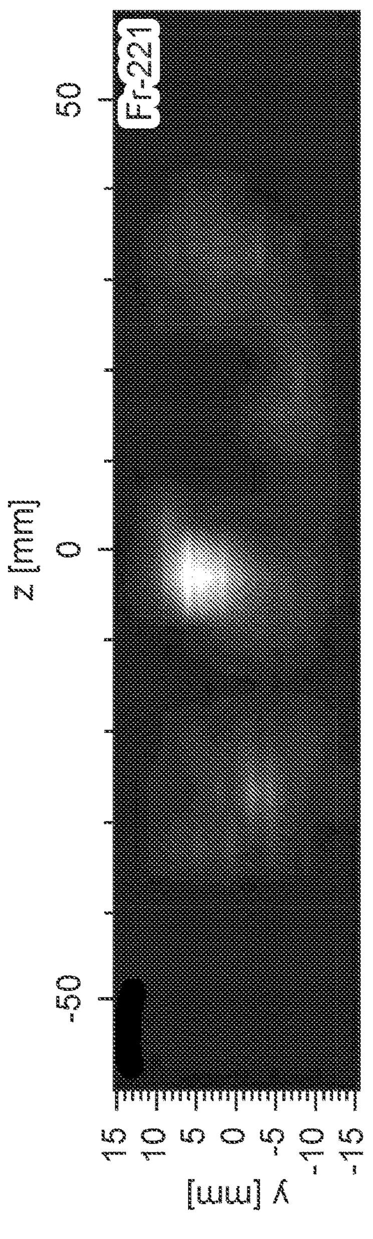
Figure 13G:
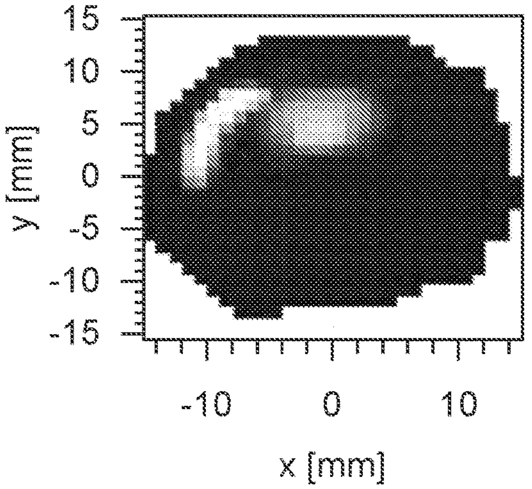
Figure 13H:
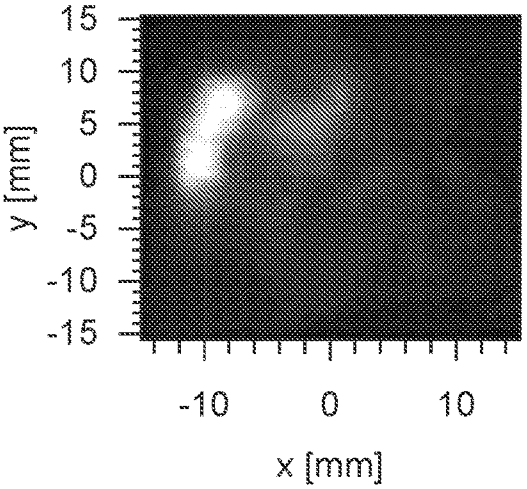
Figure 13I:
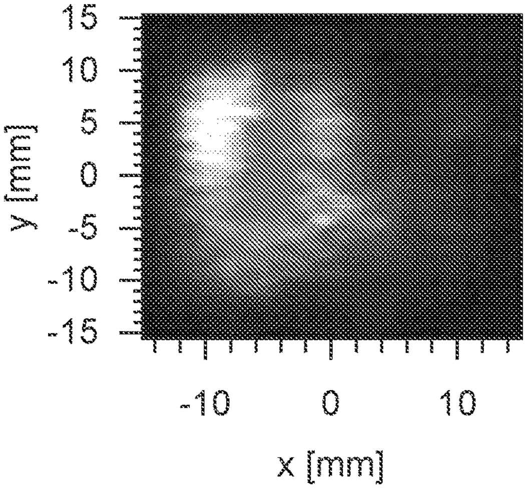

The complicated structure of the micro-Derenzo phantom could not be resolved by the current proximity reconstruction for such low activities, thus, its performance was evaluated with a different phantom. An acrylic phantom was defined with 3 pairs of rods of 3 mm, 2 mm and 1 mm diameter filled with water and at distances 2 cm, 1.5 cm and 1 cm from each other, respectively (FIG. 12A-12C). The thickness of the phantom was 1 mm and it was located at 1 mm from the top scatterer's front face. Proximity imaging identifies and resolves every volume for a total activity of 0.1 μCi (an order of magnitude lower than for Compton imaging of the micro-Derenzo phantom) and an exposure of 15 minutes (FIG. 12A-12C) for both $^{221}$Fr and $^{213}$Bi.

In addition, a mouse phantom (MOBY) was simulated with 0.5 μCi of $^{225}$Ac equally distributed in the brain, spleen and muscle (0.167 μCi each). This provided a realistic scenario with a high activity and localized region (spleen), a medium activity and more extensive region (brain), and a low activity region that plays the role of a warm background (muscle) (FIG. 13A-13I). After a 15 minutes exposure, the Compton reconstruction provided 3D images with a single bed position, with projections shown in FIG. 13A-13I compared to the ground truth distributions. The ZX plane shows the spleen and brain regions clearly resolved for both Fr and Bi, with some reconstruction artifacts at negative Z values. The organs could also be resolved in the Y coordinate even without a lateral view. Resolution on the Y coordinate could be improved by a second detector view with the detector rotated 90° along the Z axis.

The proximity imaging reconstruction was applied to the same mouse phantom simulation but with a shorter exposure of 5 minutes. Proximity images show the ability to resolve both organs, obtaining a better quality image for $^{221}$Fr than for $^{213}$Bi, given the much higher sensitivity of the latter. Due to this reason, noise is enhanced in the $^{213}$Bi case with respect to the $^{221}$Fr case, which justifies the lower number of OSEM iterations.

REFERENCES

[1] Sharjeel Usmani et al. "225Ac Prostate-Specific Membrane Antigen Posttherapy alpha Imaging". In: *Clinical Nuclear Medicine* 44.Issue 5 (2019), pp. 401-403.

[2] Ocak Meltem et al. "Post-therapy imaging of 225Ac-DOTATATE treatment in a patient with recurrent neuroendocrine tumor". In: *European Journal of Nuclear Medicine and Molecular Imaging* 47 (2020), pp. 2711-2712.

[3] Rakhee Vatsa et al. "225Ac-PSMA-617 Radioligand Posttherapy Imaging in Metastatic Castrate-Resistant Prostate Cancer Patient Using 3 Photopeaks". In: *Clinical Nuclear Medicine* 45.Issue 6 (2020), pp. 437-438.

[4] Koramadai Karuppusamy Kamaleshwaran et al. "Whole-body and Single-Photon Emission Computed Tomography/Computed Tomography Postpeptide Receptor Alpha Radionuclide Therapy Images of Actinium 225-Tetraazacyclododecanetetraacetic Acid-Octreotide as a Primary Modality of Treatment in a Patient with Advanced Rectal Neuroendocrine Tumor with Metastases". In: *Indian J Nucl Med.* 35. Issue 3 (2020), pp. 226-228.

[5] A. Gosewisch et al. "Image-based dosimetry for 225Ac-PSMA-I&T therapy using quantitative SPECT". In: *European Journal of Nuclear Medicine and Molecular Imaging* 48 (2021), pp. 1260-1261.

[6] C. Yoon et al. "Estimate of the $^{225}$Ac Radioactive Isotope Distribution by Means of DOI Compton Imaging in Targeted Alpha Radiotherapy: A Monte Carlo Simulation". In: *Journal of the Korean Physical Society* 76 (2020), pp. 954-960.

Accordingly, the preceding merely illustrates the principles of the present disclosure. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein.

What is claimed is:

1. A gamma camera comprising:

an analysis region comprising a spatial area configured to receive a sample;

a first detector head configured for Compton imaging and positioned to receive gamma radiation from the analysis region, the first detector head comprising a first scatterer and a first absorber parallel to the first scatterer; and a second detector head configured for proximity positioned on the opposite side of the analysis region relative to the first detector head, the second detector head comprising a second scatterer and a second absorber parallel to the second scatterer; and wherein the second detector head is located 10 mm or closer to the analysis region.

2. The gamma camera according to claim 1, wherein the gamma camera does not include a collimator.

3. The gamma camera according to claim 1, wherein the first and second scatterers are comprised of a high-z material.

4. The gamma camera according to claim 3, wherein the first and second scatterers or the first and second absorbers are semiconductor detectors.

5. The gamma camera according to claim 1, wherein the first scatterer is positioned between the first absorber and the analysis region, and wherein the second scatterer is positioned between the second absorber and the analysis region.

6. The gamma camera according to claim 1, wherein the first scatterer is separated from the second scatterer by a distance ranging from 20 mm to 40 mm;

wherein the first scatterer is separated from the first absorber by a distance ranging from 10 mm to 40 mm; and wherein the second scatterer is separated from the second absorber by a distance ranging from 10 mm to 40 mm.

7. The gamma camera according to claim 6, wherein the distance between the first and second scatterers is adjustable.

8. The gamma camera according to claim 7, wherein at least one of the first and second scatterers is configured to be positioned in direct contact with the sample.

9. A system comprising:

the gamma camera of claim 1; and a processor in a signal-receiving relationship with the gamma camera, wherein the processor is configured to construct an image based on signals received from the gamma camera.

10. The system according to claim 9, wherein the processor is in a signal-receiving relationship with the first and second absorbers, wherein the processor is configured to construct the image based on signals received from Compton scattering.

11. The system according to claim 10, wherein the processor is configured to construct the image using a ListMode Ordered Subset Expectation Maximization (LM-OSEM) reconstruction algorithm.

12. The system according to claim 9, wherein the processor is in a signal-receiving relationship with the first and second scatterers, wherein the processor is configured to construct the image based on signals received from photoelectric absorption by the first and second scatterers.

13. The system according to claim 12, wherein the processor is configured to construct the image using an Ordered Subset Expectation Maximization (OSEM) reconstruction algorithm.

14. The system according to claim 9, further comprising a display configured to depict the image constructed by the processor.

15. A method of radionuclide imaging, the method comprising:

(a) introducing a radioactive sample into a system comprising:

the system of claim 9; and (b) receiving the constructed image from the processor.

16. The method according to claim 15, wherein the processor is in a signal-receiving relationship with the first and second absorbers, wherein the processor is configured to construct the image based on signals received from Compton scattering.

17. The method according to claim 16, wherein the processor is configured to construct the image using a ListMode Ordered Subset Expectation Maximization (LM-OSEM) reconstruction algorithm.

18. The method according to claim 15, wherein the processor is in a signal-receiving relationship with the first and second scatterers, wherein the processor is configured to construct the image based on signals received from photoelectric absorption by the first and second scatterers.

19. The method according to claim 18, wherein the processor is configured to construct the image using an Ordered Subset Expectation Maximization (OSEM) reconstruction algorithm.

20. The method according to claim 15, wherein the first scatterer is positioned between the first absorber and the analysis region, and wherein the second scatterer is positioned between the second absorber and the analysis region.

21. The method according to claim 15, wherein the radioactive sample comprises $^{225}Ac$ or $^{227}Th$.

* * * * *